US012159746B2

(12) United States Patent
Fogelberg

(10) Patent No.: US 12,159,746 B2
(45) Date of Patent: Dec. 3, 2024

(54) TRANSFORMER AND REACTOR CORES WITH NEW DESIGNS AND METHODS FOR MANUFACTURING

(71) Applicant: FOGELBERG CONSULTING AB, Ludvika (SE)

(72) Inventor: Thomas Fogelberg, Ludvika (SE)

(73) Assignee: FOGELBERG CONSULTING AB, Ludvika (SE)

( * ) Notice: Subject to any disclaimer, the term of this patent is extended or adjusted under 35 U.S.C. 154(b) by 715 days.

(21) Appl. No.: 17/269,893

(22) PCT Filed: Aug. 9, 2019

(86) PCT No.: PCT/SE2019/050732
§ 371 (c)(1),
(2) Date: Feb. 19, 2021

(87) PCT Pub. No.: WO2020/040681
PCT Pub. Date: Feb. 27, 2020

(65) Prior Publication Data

US 2021/0327644 A1 Oct. 21, 2021

(30) Foreign Application Priority Data

Aug. 20, 2018 (SE) .................................... 1850992-7

(51) Int. Cl.
*H01F 41/02* (2006.01)
*H01F 3/02* (2006.01)
(Continued)

(52) U.S. Cl.
CPC ........... *H01F 41/0233* (2013.01); *H01F 3/02* (2013.01); *H01F 3/14* (2013.01); *H01F 27/245* (2013.01);
(Continued)

(58) Field of Classification Search
CPC .... H01F 27/245; H01F 3/02; H01F 2003/106; H01F 41/0233; H01F 27/263; H01F 3/10;
(Continued)

(56) References Cited

U.S. PATENT DOCUMENTS 2,821,688 A 1/1958 Gordy
2,922,972 A * 1/1960 Gordy .................. H01F 27/245 336/215

(Continued)

FOREIGN PATENT DOCUMENTS

CH 310611 A 10/1955
DE 1114581 B 10/1961

(Continued)

OTHER PUBLICATIONS

Search Report, European Application No. 19852885, Search completion date Apr. 6, 2022.

(Continued)

*Primary Examiner* — Malcolm Barnes
(74) *Attorney, Agent, or Firm* — MARSHALL, GERSTEIN & BORUN LLP

(57) ABSTRACT

A method and an apparatus for almost scrap-less manufacturing of magnetic cores for electrical power transformers or reactors. The method cutting a cut-out from the middle of a long side of a rectangular yoke plate made of electrical steel such that a symmetric gap is formed in the yoke plate, forming building elements grain oriented electrical steel either from the cut-out or from a rectangular limb plate, repositioning the building elements such that at least some of the building elements get a new orientation and/or position in relation to the yoke plate or the limb plate, and building a magnetic core by assembling at least yoke plates and repositioned building elements such that the repositioned building elements fit into the symmetric gaps. Mag-
(Continued)

netic cores for electrical power transformers or reactors are also provided, where the core losses and noise levels are reduced compared to prior art technology.

10 Claims, 24 Drawing Sheets

(51) Int. Cl.
*H01F 3/10* (2006.01)
*H01F 3/14* (2006.01)
*H01F 27/24* (2006.01)
*H01F 27/245* (2006.01)
*H01F 27/26* (2006.01)

(52) U.S. Cl.
CPC ..... *H01F 27/263* (2013.01); *H01F 2003/106* (2013.01)

(58) Field of Classification Search
CPC . H01F 3/14; H01F 27/25; H01F 27/26; H01F 27/28; H01F 3/04; H01F 41/0206
See application file for complete search history.

(56) References Cited

U.S. PATENT DOCUMENTS

| | | | | |
|---|---|---|---|---|
| 2017/0062118 | A1 | 3/2017 | Sarver et al. | |
| 2021/0217551 | A1 * | 7/2021 | Mousavi | H01F 27/245 |

FOREIGN PATENT DOCUMENTS

| | | | | | |
|---|---|---|---|---|---|
| EP | 3330980 | A1 | 6/2018 | | |
| WO | WO-2013012506 | A1 * | 1/2013 | | H01F 27/245 |

OTHER PUBLICATIONS

International Search Report and Written Opinion received for PCT/SE2019/050732 dated Nov. 13, 2019.

* cited by examiner

TRANSFORMER AND REACTOR CORES WITH NEW DESIGNS AND METHODS FOR MANUFACTURING

TECHNICAL FIELD

The present invention generally relates to electrical power transformers and reactors, and more particularly to new designs of magnetic cores for transformers and reactors, and new methods for manufacturing such cores.

BACKGROUND

In the field of transportation of electricity where transmission and distribution networks are used, the energy losses in the European Union (EU) are around 7% of generated power. Almost half of this relates to the transformers and 25% of all energy losses come from no-load losses (stand-by) in transformer cores. In the world the transformer losses amount to over 1100 TWh, which is about 7 times the power generation in Sweden. 50% of these 1100 TWh comes from no-load losses. (United4efficiency.org (UN Environment 2017)).

EU Commission Regulation No 548/2014 of 21 May 2014, which stipulates Minimum Efficiency Performance Standard (MEPS) in max values or Peak Efficiency Index for losses in transformers, is now in force. This regulation is in 2 tiers; one for 2015 and the next for 2021. The regulation has two purposes: 1) to limit the transformer losses and 2) to stimulate the industry to be innovate in new ways of manufacturing transformers.

Since 1950 the core steel material in transformer and reactor cores has gone through a radical development where the losses have been reduced with almost 50% from 1.40 W/kg (Armco 1956) to 0.68 W/kg (NSC 2014). However, the design of transformer and reactor cores have been almost the same in about 50-65 years. Therefore, there is a great need for improvements in the transformer and reactor core technology to further reduce the losses.

Furthermore, with the current process for manufacturing three-phase transformer cores the amount of material scrap can be from 5% up to 7%. Today the total global volume of Grain Oriented Electrical Steel (GOES) produced for use in transformer manufacturing is around 2.000.000 tonnes, which means that the scrap created can be about 100.000 tonnes at a value of nearly 250.000.000 EUR. These volumes are expected to increase with about 3.5% a year for the next 20 years. Therefore, there is also a great need for improvements in the process for manufacturing transformers in order to reduce the amount of material wasted.

SUMMARY

It is an object to provide magnetic cores for electrical power transformers or reactors with reduced energy losses and/or reduced scrap, and methods for manufacturing such cores.

These and other objects are met by embodiments of the proposed technology.

According to a first aspect, there is provided a method for manufacturing a magnetic core for an electrical power transformer or reactor. The method comprises cutting a symmetric cut-out from the middle of a long side of a rectangular yoke plate made of electrical steel such that a symmetric gap is formed in the yoke plate, forming building elements of grain oriented electrical steel either from the symmetric cut-out if the yoke plate is made of grain oriented electrical steel or from an end cut from a short end of a rectangular limb plate made of grain oriented electrical steel, repositioning the building elements such that at least some of the building elements get a new orientation and/or position in relation to the yoke plate or the limb plate after the repositioning, and building a magnetic core by assembling at least yoke plates and repositioned building elements such that the repositioned building elements fit into the symmetric gaps formed in the yoke plates at the positions and with the orientations the building elements got after the repositioning.

According to a second aspect, there is provided a magnetic core for an electrical power transformer or reactor. The magnetic core comprises two parallel and spaced-apart yokes, where the yokes comprise rectangular yoke plates made of electrical steel. Each yoke plate has a symmetric gap at the middle of a long side of the yoke plate, the symmetric gap facing towards the other yoke. The magnetic core further comprises building elements made of grain oriented electrical steel, positioned in the symmetric gaps in the yoke plates, where the building elements have the same size and shape as the symmetric gap, or where the building elements have the same size and shape as the symmetric gap divided into two equal parts. In particular, magnetic hybrid cores with grain oriented electrical steel and amorphous steel are provided.

According to a third aspect, there is provided an electrical power reactor comprising a magnetic core according to the above.

According to a fourth aspect, there is provided an electrical power transformer comprising a magnetic core according to the above.

According to a fifth aspect, there is provided an apparatus configured to manufacture a magnetic core for an electrical power transformer or reactor. The apparatus comprises a high power laser equipment, HPL, configured to cut a symmetric cut-out from the middle of a long side of a rectangular yoke plate made of electrical steel such that a symmetric gap is formed in the yoke plate, and/or an end cut from a short end of a rectangular limb plate made of electrical steel, and to divide the cut-out and/or the end cut into building elements, a positioning equipment configured to reposition the building elements such that at least some of the building elements get a new orientation and/or position in relation to the yoke plate or the limb plate after the repositioning, and a stacking equipment configured to build a magnetic core by assembling at least yoke plates and repositioned building elements such that the repositioned building elements fit into the symmetric gaps formed in the yoke plates at the positions and with the orientations the building elements got after the repositioning.

With the presently disclosed technology, electrical power transformer and reactor cores can be manufactured with almost no scrap, and at the same time the core losses and noise levels in the new cores will be significantly reduced compared to prior art technology.

Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

The present invention generally relates to electrical power transformers and reactors, and more particularly to new designs of transformer and reactor cores with reduced energy losses, and new methods which reduce the amount of scrap produced when manufacturing such cores.

Throughout the drawings, the same reference designations are used for similar or corresponding elements.

As mentioned above, the core steel material in transformer and reactor cores has gone through a radical development where the losses have been reduced with almost 50% since the 1950s, whereas very little improvement has been made on the core design itself. This is mainly because of limited knowledge of the electromagnetic behaviour in the three-dimensional cores built up from strongly anisotropic electrical steel. This limited development is valid for both stacked, planar cores and wound cores of different forms. One major reason is the lack of computerized magnetic simulation models where neither different 3D reluctance paths nor joints have been fully described, together with their impact on magnetic flux patterns and thereby the magnetic losses from the frequency dependence of hysteresis part, eddy current loss part and the anomalous loss part.

Figure 1A:
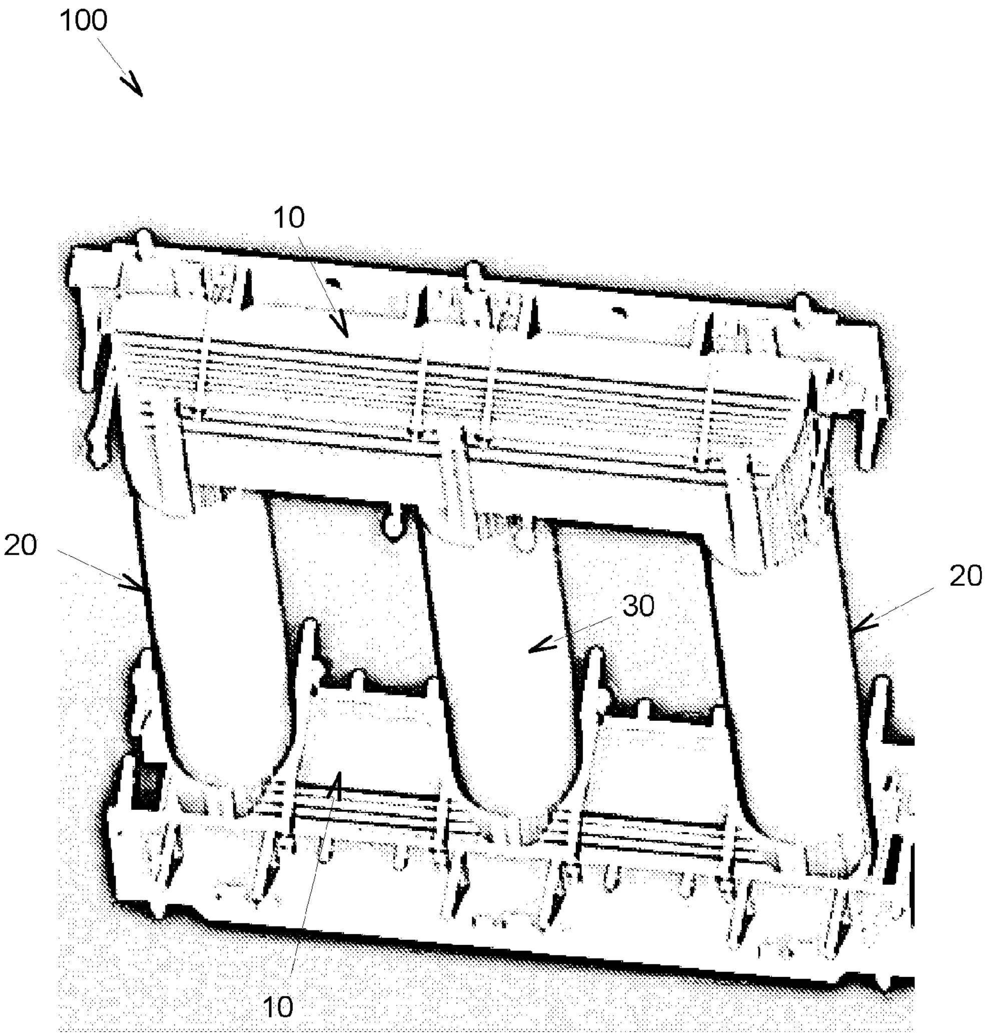
FIG. 1*a* is a schematic illustration of a three-phase transformer core according to prior art technology.
Figure 1B:
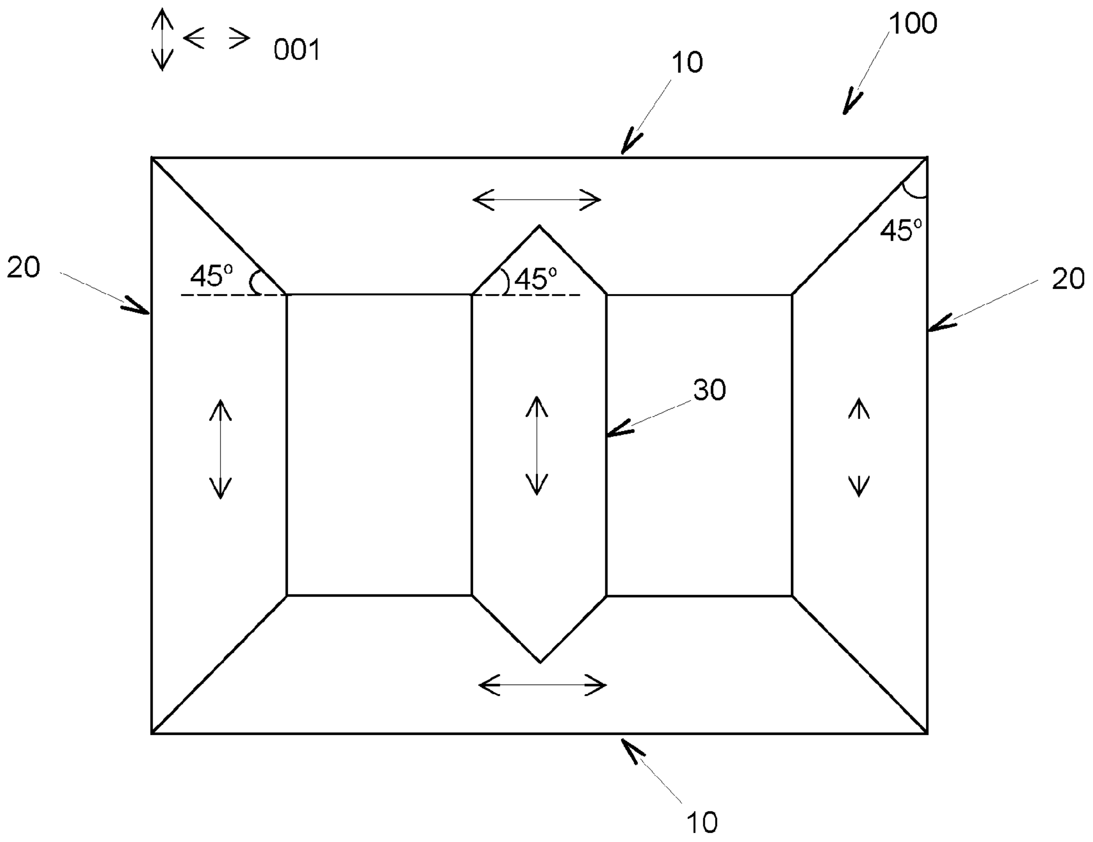
FIG. 1*b* is a schematic illustration of a three-phase transformer core according to prior art technology.

As illustrated in FIG. 1*a*, a typical three-phase transformer planar core 100 comprises two outer limbs 20, a centre limb 30 and two yokes 10. The limbs and the yokes are stacked from rectangular plates of electrical steel. To get the transformer function, windings (not shown in the figure) around the core limbs are needed. FIG. 1*b* illustrates such a transformer core 100 with typical mitre joints of 45° in the T-joint (centre joint between the centre limb 30 and the yokes 10) and 45° in the L-joint corner (corner joint between the outer limbs 20 and the yokes 10). Three-phase transformer planar cores have been stacked the last 65 years with mitre joints of 45° in the T-joint and 45° in the L-joint corner. In the latest 30 years those cores have multi-step lap joints with some offset between pairs of laminations, normally in a vertical direction. The ongoing climate crisis has led to No-Load Loss Regulation by governments in many regions of the world, e.g. EC regulation by Eco Designs. Those regulations are either stipulating maximum losses or minimum energy efficiency indexes in steps for coming years. This forces the manufacturing plants of transformers to use highly anisotropic material in the cores. Those sharper energy efficiency laws force manufacturers to use much more material in order to reduce the flux-densities, since new transformer technologies are not available. 3D electromagnetic simulation tools as FEM are not magnetically strong enough to lead innovation. The permeability variations in all 3D directions locally and in time are too complex still today to be simulated for full understanding in computers. As the full electromagnetic theory is not fully understood the core design and core manufacturing technology can however be improved by experience and model experiments. The core steel has its specific iron loss, but built into the core the losses increase, expressed by a building factor. So far, some historical traditions have been the base to explain the cause of the building factor and the loss pattern in cores.

The present innovation aims to reduce the building factor for cores, where:

Core losses=Building factor×Iron losses

The invention also seeks to meet sustainability goals by providing a method for manufacturing 3-phase cores, without any scrap, of Grain Oriented Electrical Steel (GOES) of anisotropic type, or of amorphous electrical steel/metal (AM), or of combinations of both.

Electrical steel made without special processing to control crystal and domain orientation, non-oriented steel, has similar magnetic properties in all directions, i.e., it is isotropic. Grain-oriented electrical steel (GOES) is processed in such a way that the optimal properties are developed in the rolling direction, due to a tight control of the crystal orientation relative to the sheet. It is mainly used as the core material in electrical transformers that require high permeability and low power losses. The magnetic properties are highly anisotropic and the easiest magnetization direction or magnetic orientation is parallel to the magnetic field direction. FIG. 1*b* illustrates the magnetic orientation 001 in the limbs 20, 30 and the yokes 10 of a typical three-phase transformer planar core 100 made of GOES steel plates, i.e. the magnetic orientation 001 is parallel to the long side of the rectangular plates.

Amorphous electrical steel/metal is a metallic glass prepared by pouring molten alloy steel onto a rotating cooled wheel, which cools the metal so fast that crystals do not form. Since many years AM cores are of wound core types in Evan form or five leg (four ring) cores. Amorphous steel is limited to foils of about 25 μm thickness. It has poorer mechanical properties than conventional electrical steels, the AM plates have fewer widths and the maximum width of the plates is about 230 mm which limits the size of the AM cores. The AM material has a lower magnetic saturation level than conventional electrical steels, which means that more material (about 40%) is needed to make an AM core. Therefore, an AM core is slightly more expensive than a core of conventional electrical steel, but on the other hand the magnetic losses are much lower. Transformers with amorphous steel cores can therefore have core losses of about one quarter of that of conventional electrical steels.

Reactor cores are using anisotropic material in the yokes together with anisotropic material in the core segments in the limbs for larger power ratings. They have looked the same in 50 years. The design of transformer and reactor cores have looked almost the same in about 50-65 years.

The shipping and logistics of the master coils for the core steel are done from big electrical steel mills (about 17 big mill sites) around the world. Very often slitting centres are set up in some continents to spread core widths in slit bands to all transformer manufacturers. Some manufacturers have their own slitting machines together with cutting machines. Those slitting and cutting machines are very heavy mechanical equipment. Shipping of bands and storage of bands are all around the globe, which leads to loss of energy efficiency. All slitting and cutting are done by inflexible mechanical means by roller cutting and punching machines developed in the 1950s. Some manufactures of transformers don't have that equipment and buy smaller cores from core manufacturers who use above core technologies. Smaller cores up to some 10 tonnes are made by E-stackers almost automatically. An E-stacker is a stacking equipment after the cutting line.

Some of the major drawbacks of today's technology are:

Big 5 tonnes master coils and slit bands are shipped around the world.

Slitting to bands are made in hundreds of places around the world.

Slitting of bands are made by mechanical rough roller cutter/methods with inefficient methods to change cutters and the need for heavy maintenance, large energy consumptions, extra no-load losses from deformities and burrs or other edge and insulation damages.

Cutting for laminations is done by mechanical cutters which can cut at 90° or 45° with high inertia and high energy consumption which affect tolerances, burrs and damages. Those cutting machines need to be manually supervised and regularly maintained.

The cutters have been used for 60 years with some process-automation but the real drawback is that with their big investment costs and inflexibility these hinder further innovation to design T-joints and outer joints or reactor joints to fit to the real electromagnetic flux pattern in the core.

Typical design-dependent scrap and other process scrap is around 5-7%, depending on size of the three-phase core, for 45° mitre joints.

The T-joint and L-joints and reactor joints cannot with those manufacturing limitations be optimally designed to other arbitrary forms. This inflexible machining does not only cause high losses, but also high sound levels from cores where different harmonics and amplitudes are determined by the core and reactor design.

Inflexible core machines are today locking in design and further innovation.

The heavy mechanical machines require major regular manual maintenance and sometimes cause production stops.

A solution to the above problems is to employ High Power Laser (HPL) technology for manufacturing of transformer and reactor cores. HPL technology has been used for around 40 years and this technology increases in the industrial world. The HPL technology is widely spread in all industry. Some advantages of this technology are:

Slitting of steel bands can be done with highest precision and speed and without any destruction of material.

Cutting and punching of arbitrarily forms/geometries can be done with precision, speed and no destruction of magnetic characteristics.

Welding can be employed; long bands of defined widths can be manufactured, cut-outs can be re-welded and further used in the core to avoid scrap.

Slitting, cutting and welding can be done in one place.

Cut-outs in yoke-laminations and cutting of leg laminations can be done in all forms to create the lowest losses for each core design.

Slitting, cutting, welding and stacking processes can be done automatically in one machine lay-out.

HPL precision down to 0.1 mm makes it possible to build cores with finer multiple-steps with smaller overlap in joints; down to a few millimetres.

HPL technology offers a complete flexibility for new core designs to reduce no-load losses, sound levels and build 3-phase cores without scrap and also use the Amorphous Metal (AM) in new ways.

Historically the use of new oriented electrical steel (Grain Oriented Electrical Steel, GOES) discovered during the 1950s meant that three-phase cores needed to be designed and manufactured with a new stacking pattern; from 90° with overlap to new cutting angles in the corners (L-joints) and the centre joints (T-joints) with smaller overlaps. The cutting angle has been set based upon empirical evidence and machining tools to be 45°. This is now an accepted industry tradition with known characteristics in losses and sound level. Huge investments are done in heavy inflexible punching machines all over the world.

Figure 1C:
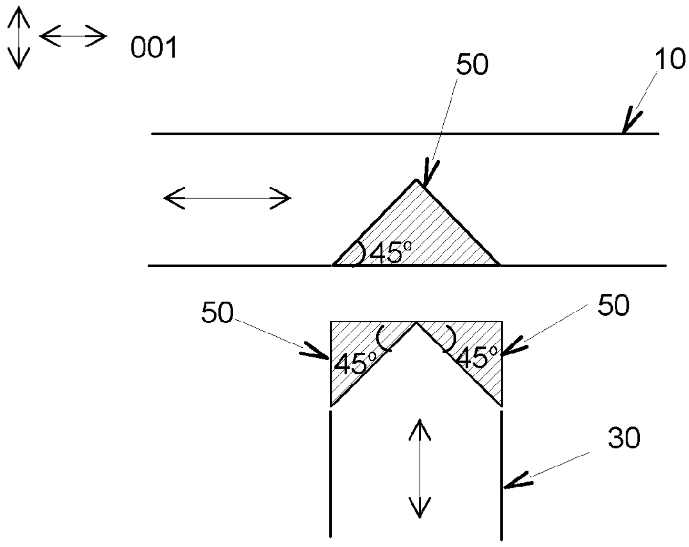
FIG. 1*c* is a schematic illustration of a T-joint in a three-phase transformer core according to prior art technology.

According to the current technology, as illustrated in FIG. 1*c*, the ends of the centre limb 30 plate are symmetrically cut at a 45° angle starting at the middle of the limb 30 plate, so that two identical, but mirrored, right-angle triangles are removed from the end, thereby forming an outward 90° corner or an "arrow" at the end of the plate. The yoke 10 plates have a corresponding symmetric cut-out forming a half of a quadrat, i.e. a triangle with one 90° corner and two 45° corners (therefore, one often talks about 45° cuttings within this field of technology), where the 45° corners are located at the edge of the yoke 10 plate so that the 90° corner is "pointing" towards the opposite edge of the yoke 10 plate, see FIG. 1*c*. The ends of the centre limb 30 fit into the cut-outs in the yokes 10, thereby forming "T-joints" between the yokes 10 and the centre limb 30.

The dashed areas in FIG. 1*c* represent scrap 50 from the cutting and will be thrown away. Typical design-dependent scrap and other process scrap is around 5-7%, depending on size of the cores, for these 45° mitre joints. The ends of the outer limb 20 plates are cut at a 45° angle to fit with the ends of the yoke 10 plates which are also cut at a 45° angle, thereby forming mitre joints of 45° or "L-joints" between the yokes 10 and the outer limbs 20 at the corners of the core 100, as shown in FIG. 1*b*.

This stacking pattern seems to have the lowest no-load losses or core losses.

The inventor has made model tests on cores built with different qualities and with 60°, 45° and 30° yoke cut-outs. The cut-outs with 60° and 30° have 10-15% higher no-load losses than the 45° cut-out. It is anticipated from those measurements that a 45° cut-out is optimal for the core losses and sound levels in three-phase cores.

But the real drawback from the core punching and building of today is the amount of scrap for all three-phase cores, from the smallest<25 kVA up to the biggest possible>750 MVA. The technical scrap can be from 5% up to 7%. Today the total yearly global GOES volume produced is around 2.000.000 tonnes and thereby those "triangles" as cut-outs create scrap of about 100.000 tonnes at a value of nearly 250.000.000 EUR per year. These volumes and costs increase by about 3.5% per year.

Based upon the apparently optimal 45° cut-out most embodiments of the present invention utilize the symmetry of a 90°-45°-45° triangle, and some embodiments similarly utilize the symmetry of a half-circle.

Figure 17A:
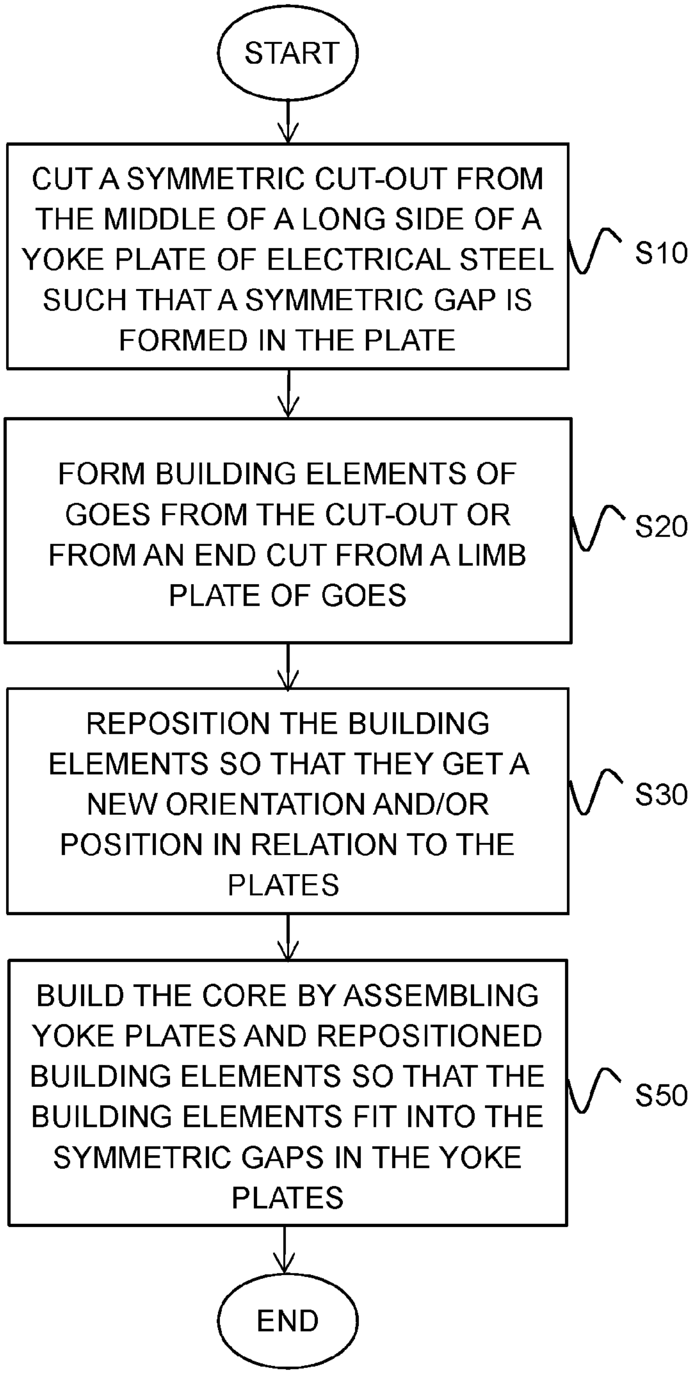
FIG. 17*a* is a schematic flow diagram illustrating an example of a method for manufacturing a magnetic core for an electrical power transformer or reactor according to an embodiment of the present disclosure.

According to the present disclosure, a method for manufacturing a magnetic core for an electrical power transformer or reactor is schematically illustrated in FIG. 17*a*. The method comprises a step S10 of cutting a cut-out from the middle of a long side of a rectangular yoke plate made of electrical steel such that a gap is formed in the yoke plate, a step S20 of forming building elements from the cut-out or from an end cut from a short end of a rectangular limb plate made of electrical steel, a step S30 of repositioning the building elements such that at least some of the building elements get a new orientation and/or position in relation to the yoke plate or the limb plate after the repositioning, and a step S50 of building a magnetic core by assembling at least yoke plates and repositioned building elements such that the repositioned building elements fit into the gaps formed in the yoke plates at the positions and with the orientations the building elements got after the repositioning.

With this technology, the cores can be built without scrap, or almost without scrap since the cut-outs are re-used as new building elements in the core instead of being thrown away as scrap. Furthermore, by cutting out, turning and moving building elements from core plates of GOES material, the magnetic orientation in parts of the core can be changed, so the magnetic flux can be guided in the core in a way that reduces the harmonics in the local flux paths, and thereby also reduces the losses and noise in the core.

With this method, a magnetic core for an electrical power transformer or reactor can be made, where the magnetic core comprises two parallel and spaced-apart yokes built from rectangular yoke plates made of electrical steel, where each yoke plate has a gap at the middle of a long side of the yoke plate, the gap facing towards the other yoke, and building elements of electrical steel which are positioned in and fit into the gaps in the yoke plates.

An apparatus for manufacturing a magnetic core for an electrical power transformer or reactor may then comprise e.g. a high power laser equipment, HPL, configured to cut the above-described cut-outs from the yoke plates and/or the end cuts from the limb plates, and to divide the cut-outs and/or the end cuts into building elements. The apparatus may also comprise a robot or some other positioning equipment configured to reposition the building elements in the manner described above, and a stacking equipment configured to build the magnetic core by assembling at least the yoke plates and the repositioned building elements, as described above. The apparatus may in a particular embodiment also comprise a welding equipment such as e.g. an electron-beam welding equipment, a gas welding equipment, or preferably a laser welding equipment, configured to attach the building elements to the yoke plates and/or the limb plates.

In the following, some non-limiting embodiments of the present invention will be described.

New Joint Patterns in T-Joints in Three-Phase Transformers to Avoid Scrap of Core Steel As described above, a lot of material scrap is produced with the current methods for manufacturing transformer cores. An innovative solution to make scrap-less three-phase cores is shown in FIGS. 2 and 3, which are schematic illustrations of a T-joint in a three-phase transformer core according to different embodiment of the present disclosure.

Figure 2A:
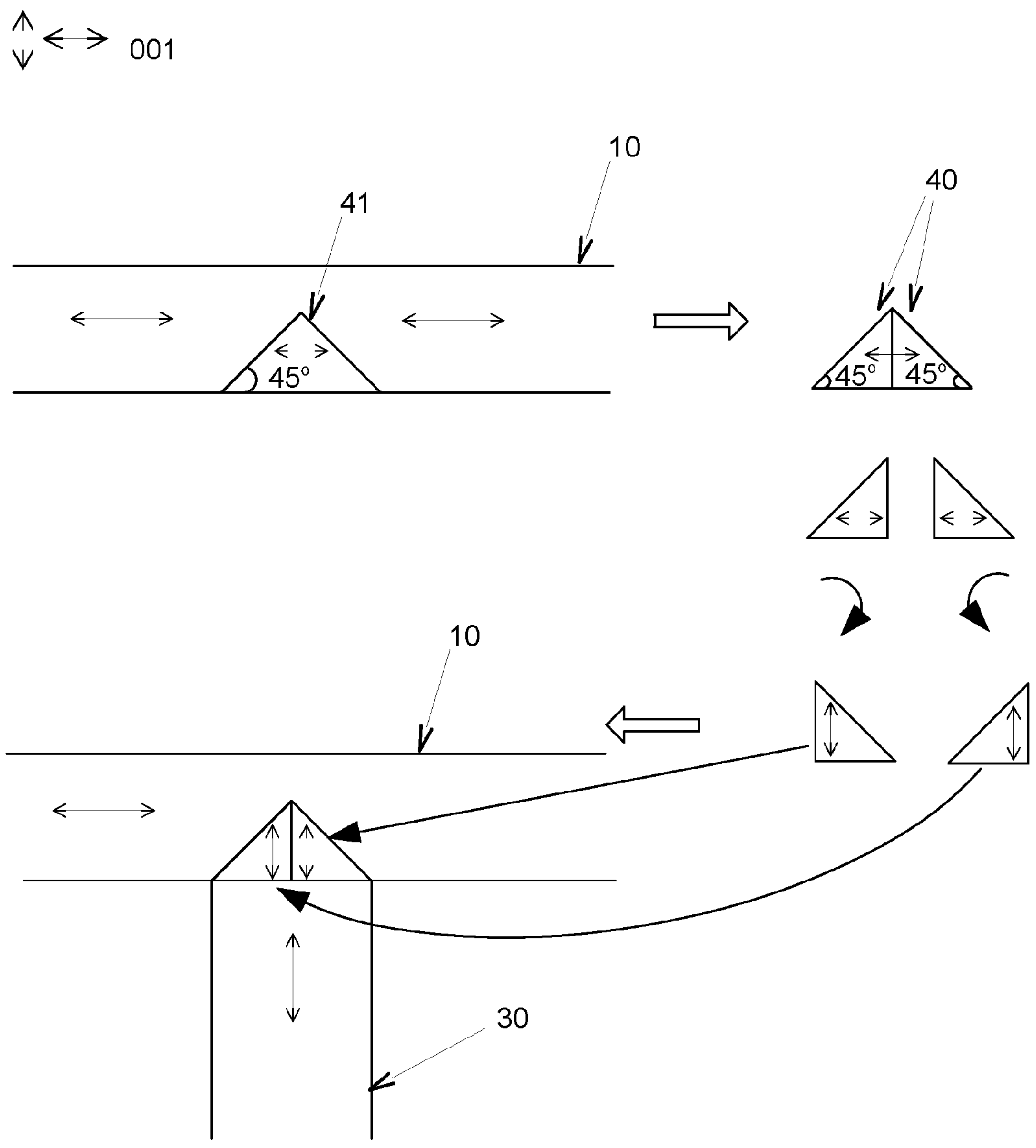
FIG. 2*a* is a schematic illustration of a T-joint in a three-phase transformer core according to an embodiment of the present disclosure.

In the embodiment shown in FIG. 2*a*, an isosceles right-angle triangular cut-out 41, i.e. a symmetric cut-out, is cut from the middle of the long side of the yoke 10, such that a symmetric gap is formed in the yoke plate. In one embodiment, a HPL laser beam is used to make the cut-out, and in another embodiment the cut-out can be mechanically punched out, as it is done in the current technology. The magnetic orientation 001 in the cut-out 41 is parallel to the long side or hypotenuse of the triangle. Instead of throwing away the triangle as scrap, it is handled as a new building block. The magnetic orientation 001 of this building block can be changed by cutting/dividing the triangle in half through its right angle, to form two new smaller and equal isosceles right-angle triangular building elements 40 of half the size of the original triangle, and with the magnetic orientation 001 along one of the short sides or legs of the triangles. Then the two smaller triangles are separated from each other, turned/rotated 90° towards each other around the normal of their plane, and the two short sides with the same orientation and the orientation directed along the short sides are attached together, e.g. by laser welding in an embodiment, or other types of welding technologies such as electron-beam welding or gas welding in other embodiments, or by some other attaching means in another embodiment, to form a new building block in the form of a triangle of equal size as the original cut-out, but with a new magnetic orientation 001 perpendicular to the long side of the triangle.

With the technology according to the present disclosure there is no need to cut the centre limb at 45° at each short end to create the "arrows" to fit into the yokes. Instead, the centre limb can be cut—with laser in one embodiment or mechanically in another embodiment—with a simple 90° cut to the length that fits between the yokes, and the triangular building blocks from the upper yoke and from the lower yoke with their new orientation can be attached to the ends of the centre limb, e.g. with laser welding in an embodiment, or other types of welding technologies in other embodiments, or by some other attaching means in another embodiment. Thus, the complete assembled centre limb will have the same magnetic orientation as a centre limb according to prior art, but the centre limb according to the present invention is manufactured without scrap.

Then the stacking of laminations can be continued, but without any scrap.

According to an embodiment, an example of a new machining sequence can be:

Outer limbs may be cut mechanically as today, or by laser to get higher precision for finer core tolerances. Laser can cut arbitrary forms and also reduce losses thanks to better precision.

Yoke laminations can be cut as today or by laser, i.e. the triangular cut-out will be cut in the yokes as today or by laser. This cut-out will then be handled as a new building block in a separate new process:

The triangle will be divided into two smaller equal triangles which are separated from each other, turned and attached along their other short sides, e.g. by laser welding or other types of welding, or by some other attaching technology, to form a new triangular building block of equal size as the original cut-out, but with a different magnetic orientation.

The centre limb is cut at 90° and can either be cut mechanically or by laser.

The centre limb will then get a new triangular building block attached to each short end, e.g. by laser welding or other types of welding, or by some other attaching technology.

The finished centre limb will be returned to the stacking process, automatically or by manual stacking.

Figure 3A:
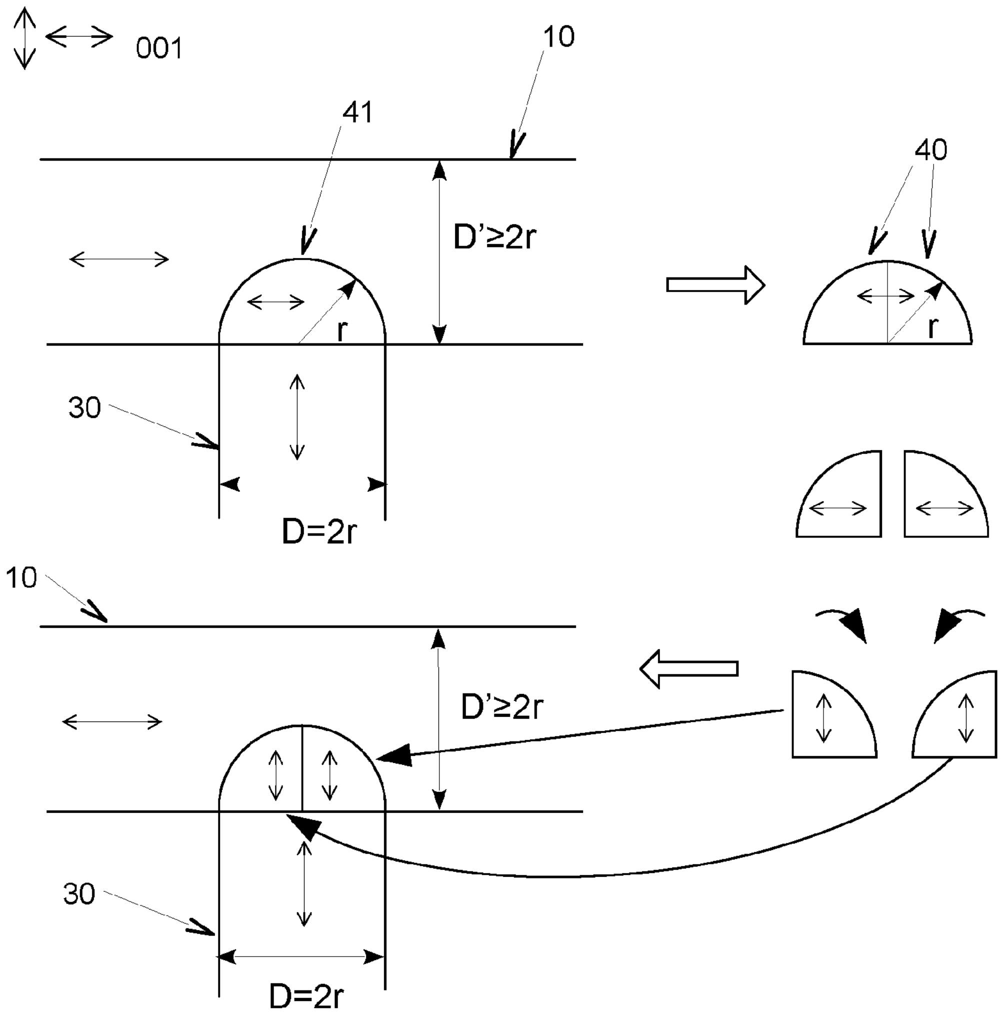
FIG. 3*a* is a schematic illustration of a T-joint in a three-phase transformer core according to another embodiment of the present disclosure.

Laser cutting has the advantage over mechanical cutting/punching in that it is very flexible and can cut almost any desired geometry at approximately the same speed as mechanical cutting. This flexibility is illustrated in FIG. 3*a* in which the cut-out pattern origins from a half-circle, which can be divided into two quarter-circles which are turned, shifted and attached (e.g. welded) in analogy with the embodiment shown in FIG. 2*a*. In the embodiment illustrated in FIG. 3*a*, the radius r of the half-circle is half the width D of the centre leg, and the width D' of the yoke is equal to or slightly larger than 2r, i.e. D'≥2r, which can also be expressed as D'=2r+x %. Similarly, the cut-out illustrated in FIG. 3*c* is also based on quarter-circles but where the arc of the quarter-circles are "inverted" as compared to FIG. 3*a*, i.e. the cut-out is formed as two adjacent squares where a quarter-circle has been removed from each square and where the arced edges of the cut-out are curving towards each other instead of away from each other. In other words, the cut-out may be considered as an isosceles concave circular triangle with one straight side, where the straight side is positioned along the long side of the yoke plate. The cut-out can be divided into two equal building blocks which are turned, shifted and attached in analogy with the embodiment shown in FIGS. 2*a* and 3*a*. The cut-out pattern of FIG. 3*c* may be particularly beneficial for guiding the flux from the centre legs into the yoke, lowering the reluctance in the joint and thereby the magnetic losses.

Figure 2B:
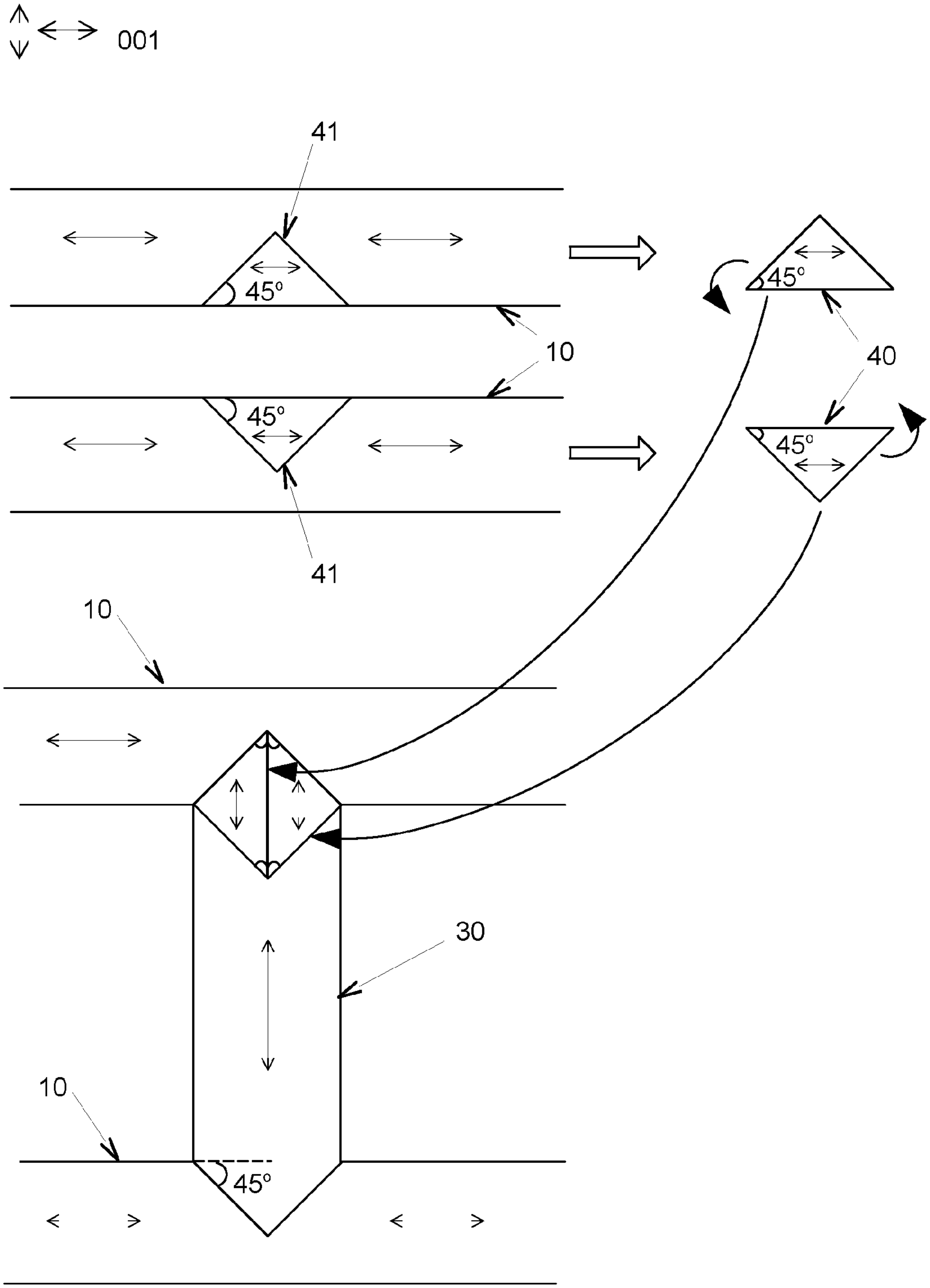
FIG. 2*b* is a schematic illustration of a T-joint in a three-phase transformer core according to another embodiment of the present disclosure.

FIG. 2*b* illustrates another possible embodiment of a T-joint, where an isosceles right-angle triangular cut-out 41 with the hypotenuse positioned along the long side of the yoke plate is cut from the yoke plates of each of the yokes 10 such that triangular gaps are formed in the yoke plates. The cut-outs 41 are used as new building elements 40 as they are, without dividing/cutting them further. The building elements 40 are then turned 90° and inserted into the gaps formed in the yoke plates of one of the yokes 10 with the bases of the triangular building elements 40 facing each other, i.e. such that they mirror each other. The magnetic orientation 001 of the building elements 40 is now 90° from the magnetic orientation 001 of the yoke plates. The centre limb 30 is cut in a scrap-less manner by cutting the ends of the limb plates in a triangular shape such that a 90° "arrow" or protrusion with the same size and shape as the building elements 40 is formed at one end of a limb plate and a corresponding triangular gap is formed at the other end of the limb plate. The end with the "arrow" is then inserted into the triangular gap in a yoke plate of one of the yokes, and the triangular building elements 40 are inserted into the gap formed at the other end of the limb plate, i.e. the building elements 40 will fit exactly into a space which is formed by the gap in the yoke plate and the gap at one of the ends of the limb plate, when the limb plate is placed adjacent to the yoke plate with the respective gaps facing each other.

Figure 3B:
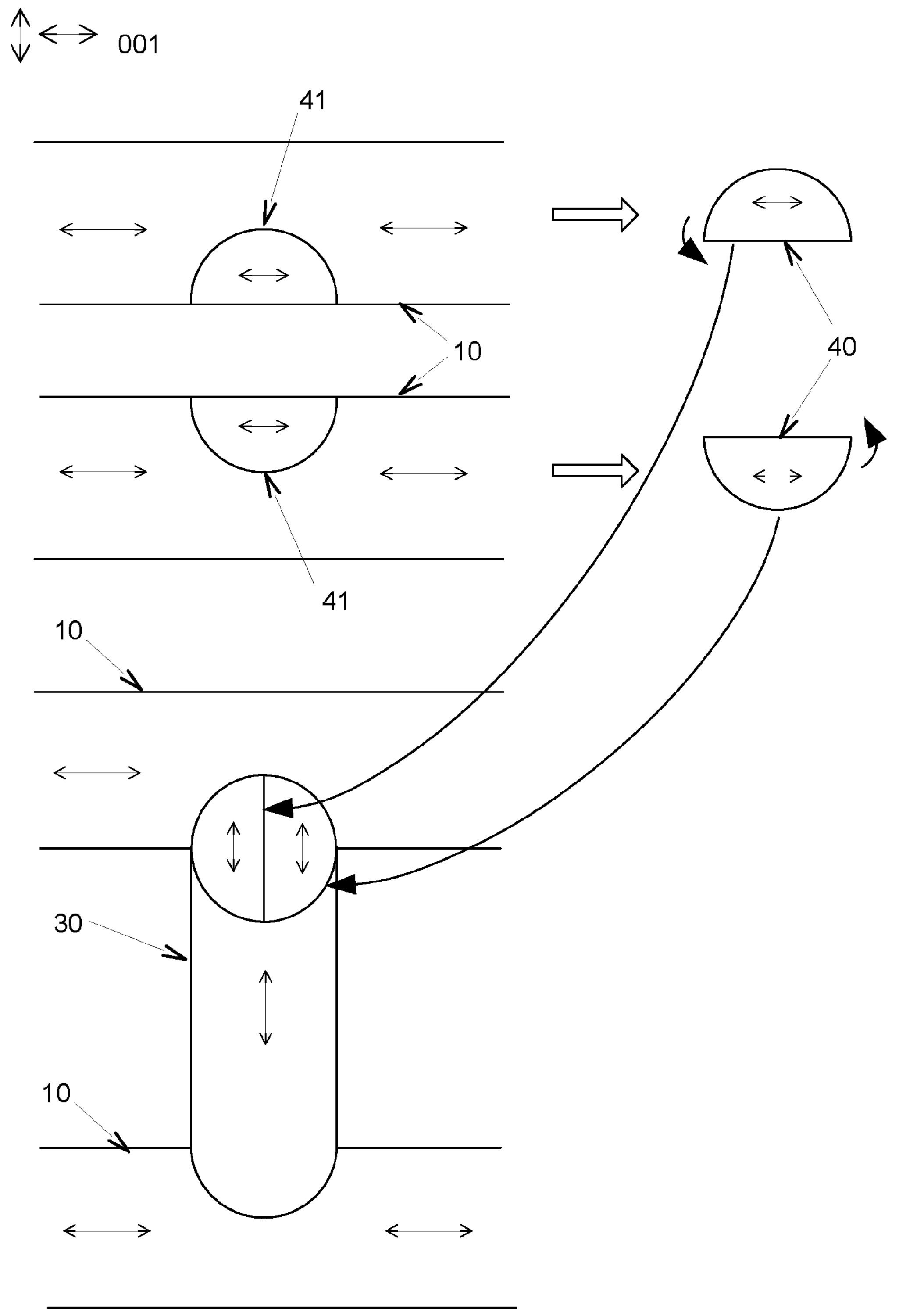
FIG. 3*b* is a schematic illustration of a T-joint in a three-phase transformer core according to another embodiment of the present disclosure.
Figure 3C:
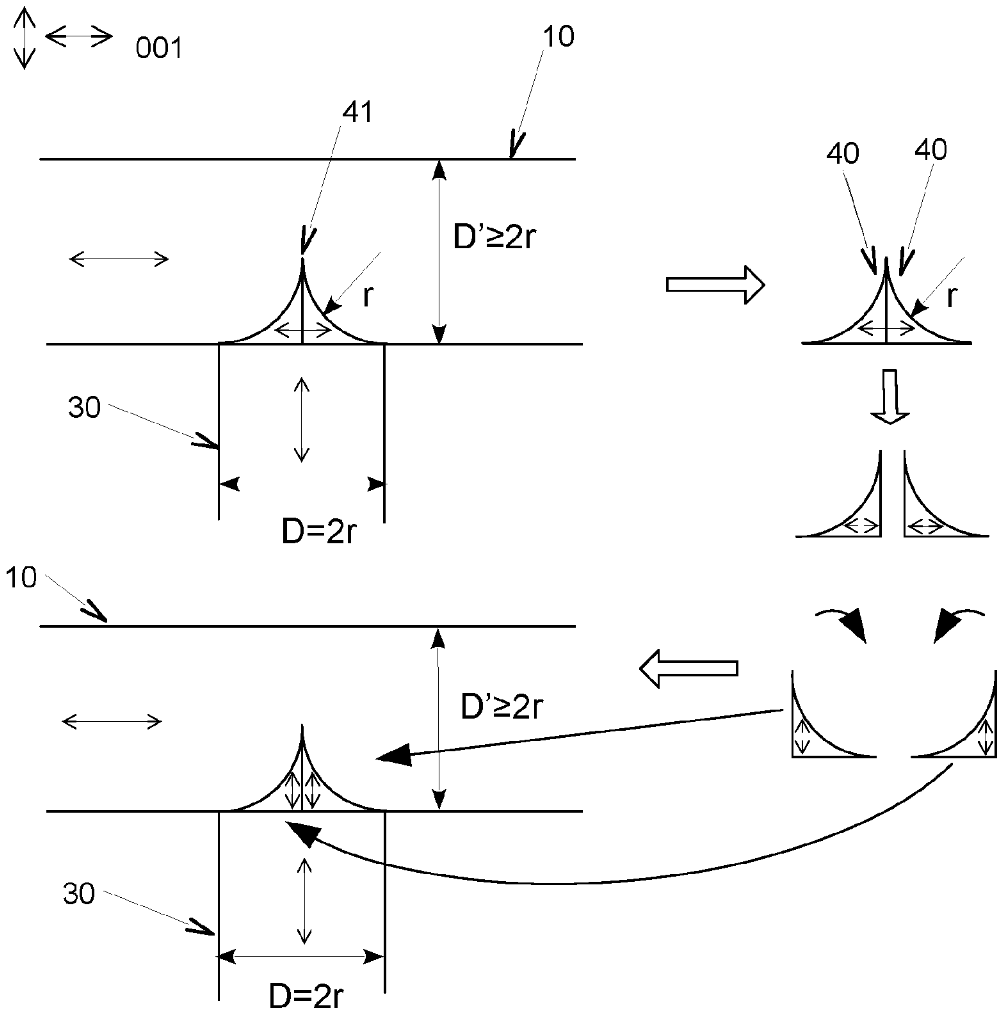
FIG. 3*c* is a schematic illustration of a T-joint in a three-phase transformer core according to another embodiment of the present disclosure.
Figure 3D:
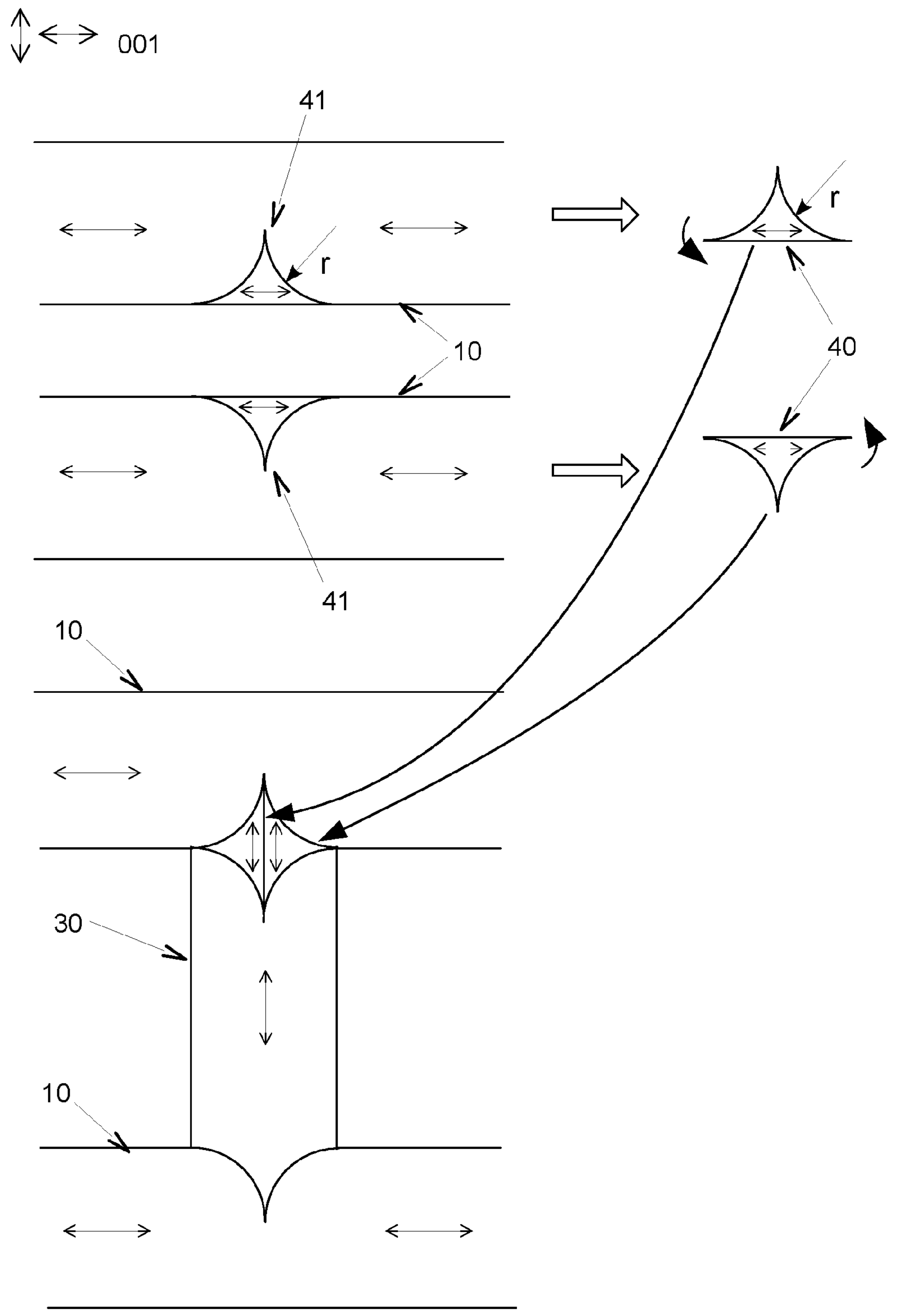
FIG. 3*d* is a schematic illustration of a T-joint in a three-phase transformer core according to another embodiment of the present disclosure.

The embodiment illustrated in FIG. 3*b* follows the same principle, but the cut-outs 41 are formed as half-circles with the diameter line positioned along the long side of the yoke plate, so that the shape of the building elements 40, as well as the gaps in the yoke plates and the gaps and protrusions at the ends of the limb plates are instead formed as half-circles. The half-circular building elements 40 are turned 90° and inserted into the space formed by the gap in the yoke plate of one of the yokes 10 and the gap at one of the ends of the limb plate, with the diameter lines of the half-circular building elements 40 facing each other. The embodiment illustrated in FIG. 3*d* also follows the same principle but the cut-outs 41 as well as the building elements 40 are formed as isosceles concave circular triangles with one straight side, where the straight side is positioned along the long side of the yoke plate, i.e. the cut-outs are based on quarter-circles but the arced edges of the cut-outs are curving towards each other instead of away from each other. The building elements 40 are turned 90° and inserted into the space formed by the gap in the yoke plate of one of the yokes 10 and the gap at one of the ends of the limb plate, with the straight sides of the building elements 40 facing each other. The cut-out pattern of FIG. 3*d* may be equally efficient for lowering the magnetic losses as the cut-out pattern of FIG. 3*c*. Other symmetric shapes of the cut-outs, building elements, gaps and protrusions may also be possible.

Figure 4A:
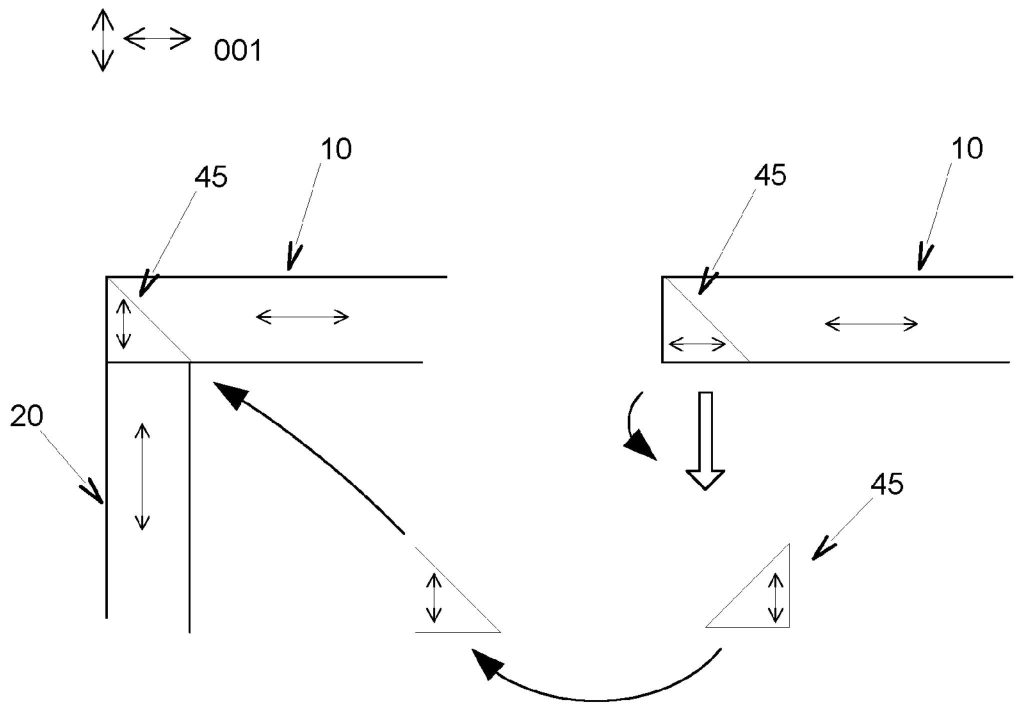
FIG. 4*a* is a schematic illustration of an L-joint in a three-phase transformer core according to an embodiment of the present disclosure.
Figure 4B:
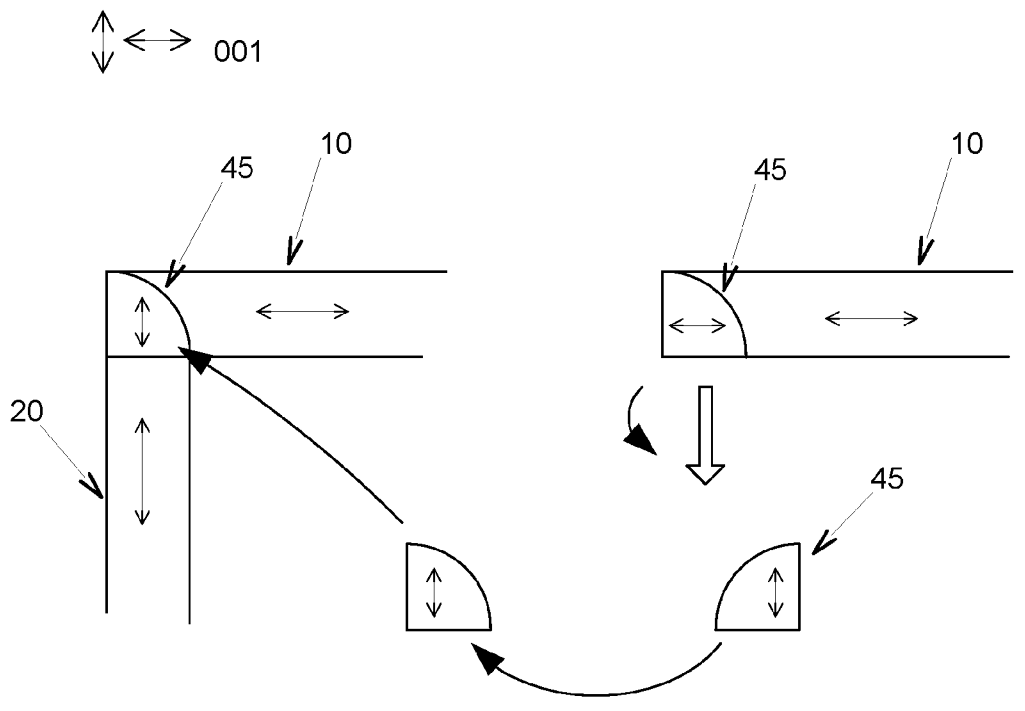
FIG. 4*b* is a schematic illustration of an L-joint in a three-phase transformer core according to another embodiment of the present disclosure.
Figure 4C:
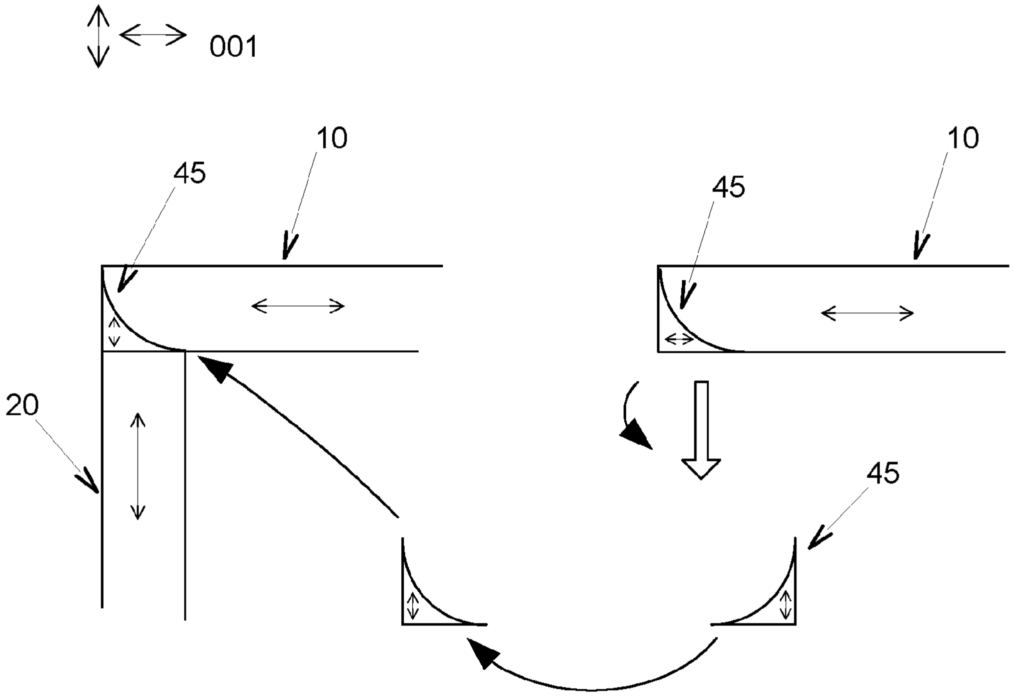
FIG. 4*c* is a schematic illustration of an L-joint in a three-phase transformer core according to another embodiment of the present disclosure.

The patterns in FIG. 2*a-b* and/or 3*a-d* can be combined with a new L-joint in the corners of the transformer core, in order to guide the 3-phase fluxes in the 3-phase core to minimize harmonics in the local flux paths. An example of a new L-joint in a three-phase transformer core according to an embodiment is schematically illustrated in FIG. 4*a*, where an end element 45 in the form of an isosceles right-angle triangle is cut from the end of a yoke 10 lamination. The short sides of the triangle are positioned along the sides of the yoke 10 and have the same length as a short side of the yoke 10. In another embodiment, as illustrated in FIG. 4*b*, the end element 45 may instead have the form of a quarter of a circle where the straight sides of the quarter-circle are positioned along the sides of the yoke and have the same length as a short side of the yoke. Other forms of end elements may also be possible in other embodiments. An example is illustrated in FIG. 4*c* where the shape of the end element 45 is also based on a quarter-circle but where the arc of the quarter-circle is "inverted" as compared to FIG. 4*b*, i.e. the end element is formed as a square where a quarter-circle has been removed, so that the arced edge of the end element is concave instead of convex. The straight sides of the end element are positioned along the sides of the yoke and have the same length as a short side of the yoke. Thereby, a bevelled end is formed at the end of the yoke such that the side of the yoke facing the other yoke is shorter than the opposite side of the yoke. The change of the orientation is done in two steps: First the end element 45 is turned 90° in the plane, i.e. it is rotated around the normal of the plane, to get the new orientation direction and then turned 180° outside the plane to get the element into a position such that a new rectangular end, with a magnetic orientation 001 which is 90° from the original magnetic orientation, is formed at the end of the yoke 10. The end element 45 is then attached to the yoke 10 or to the outer limb 20 which has been cut at 90°. The result is a scrap-less L-joint which guides the flux towards the outer part of the yoke. Other symmetrical forms can also be cut by laser to get a new orientation which can change the local flux pattern.

Figure 17B:
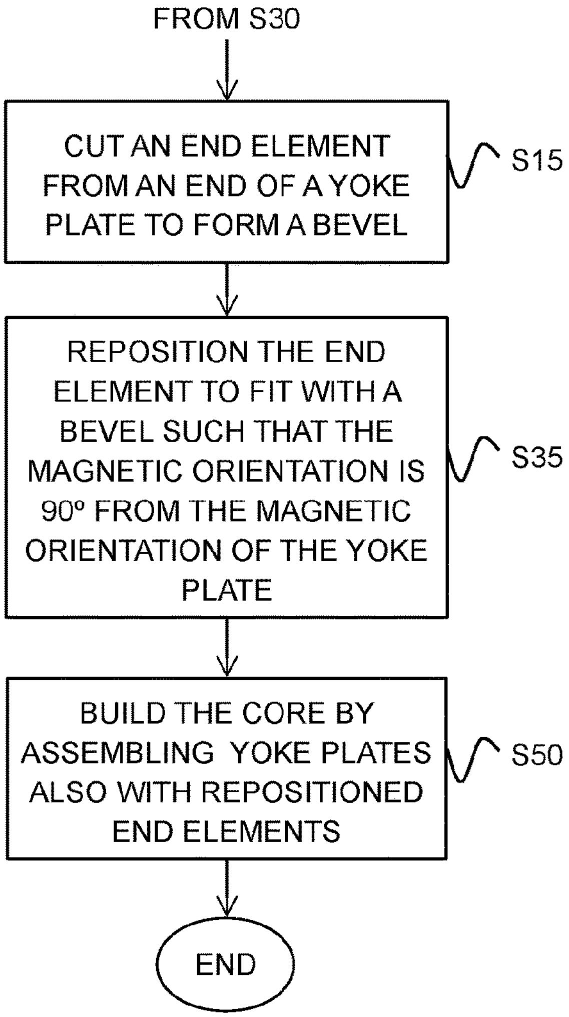
FIGS. 17*b-c* are schematic flow diagrams illustrating additional optional steps of the method of FIG. 17*a* according to different embodiments of the present disclosure.

Accordingly, the additional steps of the method shown in FIG. 17*a* required to create the L-joints of FIGS. 4*a-b* are shown in FIG. 17*b*, i.e. the method also comprises a step S15 of cutting an end element from an end of the yoke plate such that a bevel is formed at the end of the yoke plate, a step S35 of repositioning the end element to fit with a bevel of a yoke plate such that a 90° angle is formed at the end of the yoke plate, and such that the magnetic orientation of the end element after repositioning is 90° from the magnetic orientation of the yoke plate. Then, in this embodiment the step S50 of building the magnetic core further comprises assembling the yoke plates and repositioned end elements.

Figure 17C:
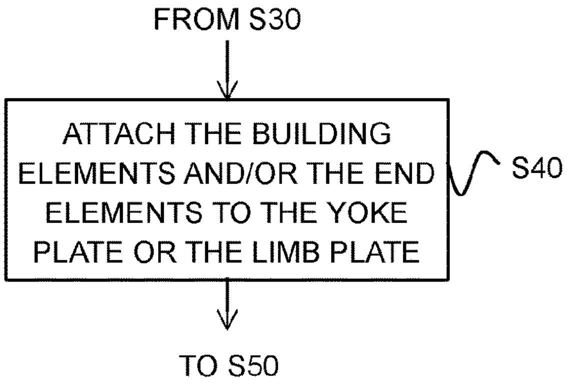

In a particular embodiment, as illustrated in FIG. 17*c*, the method of FIG. 17*a* also comprises a step S40 of attaching the repositioned building elements and/or the repositioned end elements to the yoke plate or the limb plate before building/assembling the magnetic core.

This different form of L-joint in combination with the patterns of FIG. 2*a-b* and/or FIG. 3*a-d* could change the reluctance network in the three-phase core to level out the difference of the inner reluctance path with the outer reluctance path. This change of reluctance network might reduce the building factor which is caused by harmonics of the flux in all parts of the core. The different reluctance paths in wound and planar cores are one of the biggest contributors to local flux harmonics in cores. With the present innovations, designers can reduce losses by reducing flux harmonics.

Figure 5:
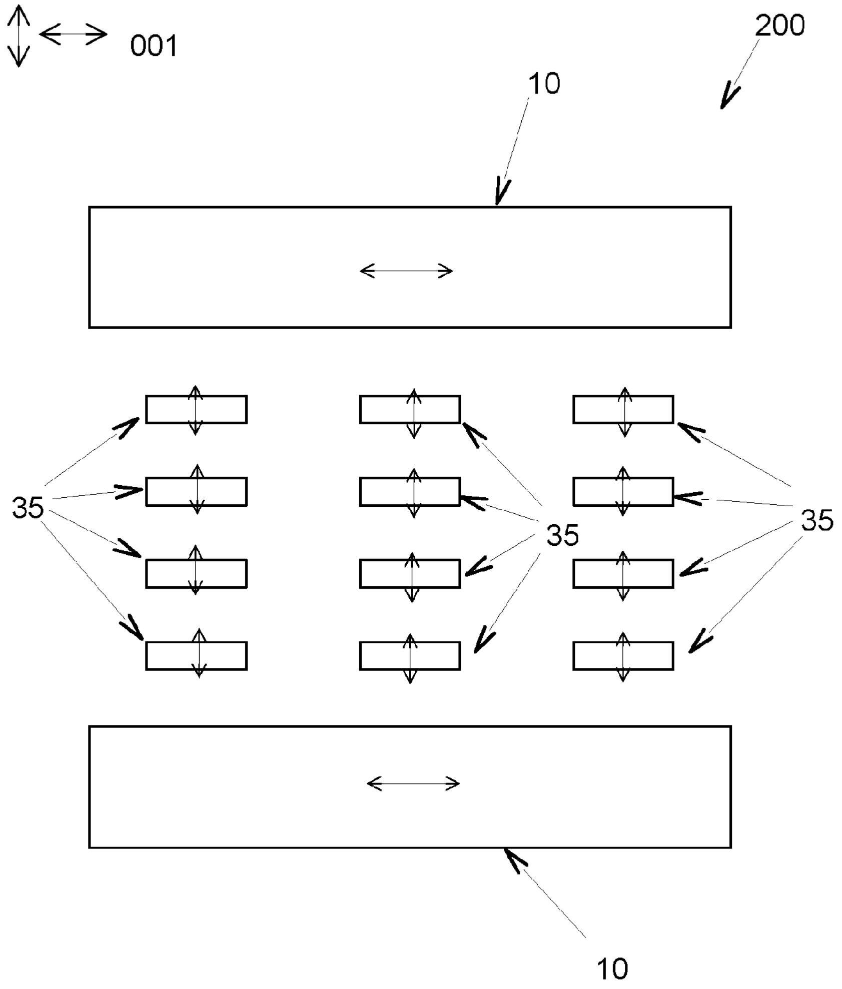
FIG. 5 is a schematic illustration of a three-phase reactor core according to prior art technology.

Three-Phase Reactor Core with Lower Losses, Lower Sound Level, New Design and New Manufacturing Process FIG. 5 is a schematic illustration of a normal three-phase reactor core 200 of GOES with core limb segments 25 of GOES according to prior art. A reactor does not have full limbs as a transformer but may instead have "gapped" limbs or limb segments between the spaced-apart yokes. Smaller cores have no core limb segments but only windings between the yokes 10. Bigger reactors have core limb segments. The present disclosure is valid for both types.

As illustrated in FIG. 5, in the prior art reactor core the three-phase magnetic flux enters the yokes 10 from the segments 25 in a perpendicular direction with regard to the core steel orientation 001 in the yokes 10. This causes large extra losses and an increase of magnetostriction, which causes high sound level and large reactor core vibrations, as the flux must pass the planar lamination in cross direction causing 2-4 times higher losses than in the direction of orientation 001.

Figure 6:
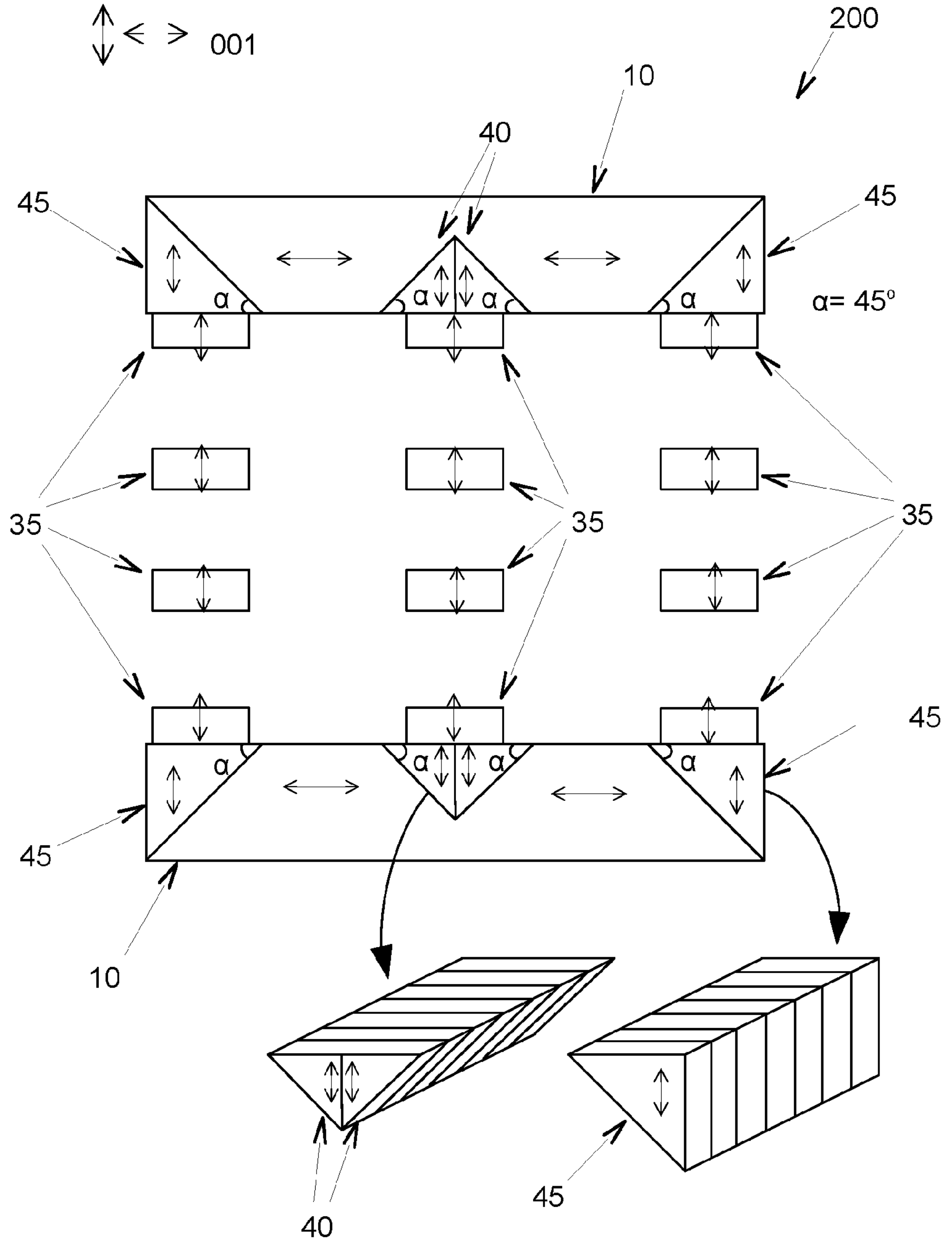
FIG. 6 is a schematic illustration of a three-phase reactor core according to an embodiment of the present disclosure.

FIG. 6 is a schematic illustration of a three-phase reactor core 200 according to an embodiment of the present disclosure. The principle of the new design and manufacturing method of this new reactor core follows the same pattern as for the three-phase transformer core described above, i.e. cutting out building elements 40 from the yokes, turning and/or moving the building elements 40 and attaching them again to the yokes with new orientations and/or in new positions. However, for the transformer cores the object of the invention is to reduce the scrap, but since reactor cores are already built in a scrap-less manner, the object for the reactor cores is instead to lower the energy losses and magnetostriction movements in the reactor core by creating flux guiding effects in the building elements 40.

Figure 7A:
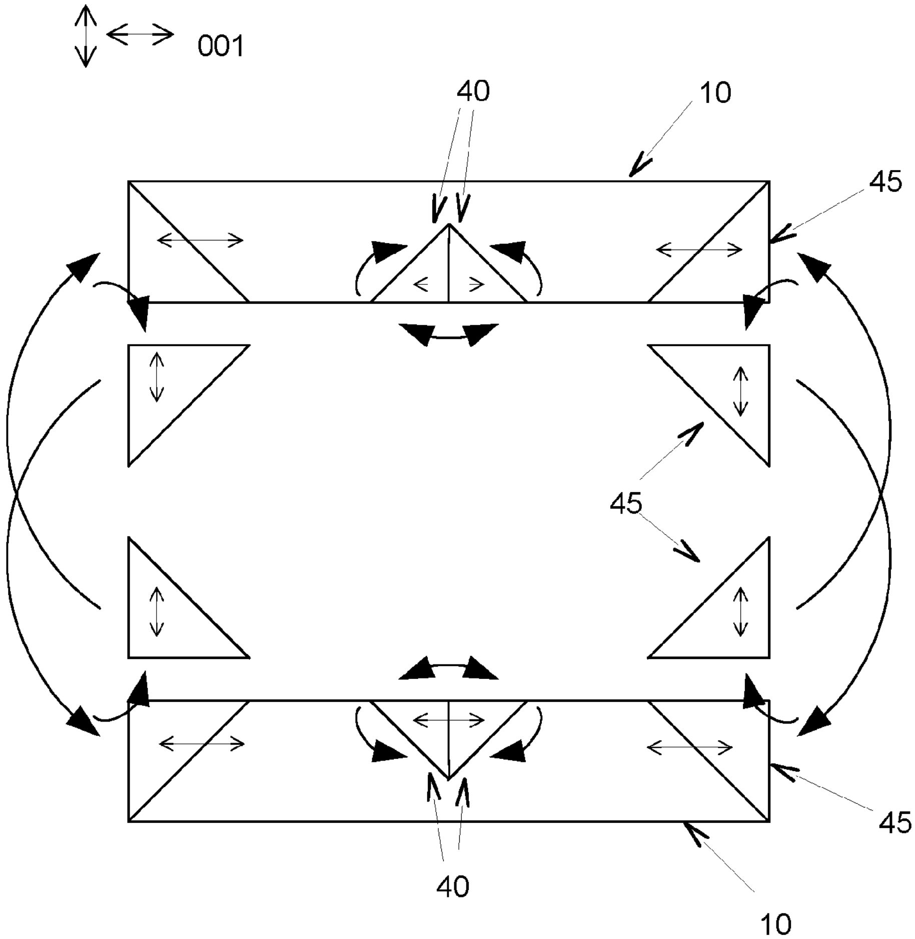
FIG. 7*a* is a schematic illustration of manufacturing logistics of the three-phase reactor core of FIG. 6 according to an embodiment of the present disclosure.
Figure 7B:
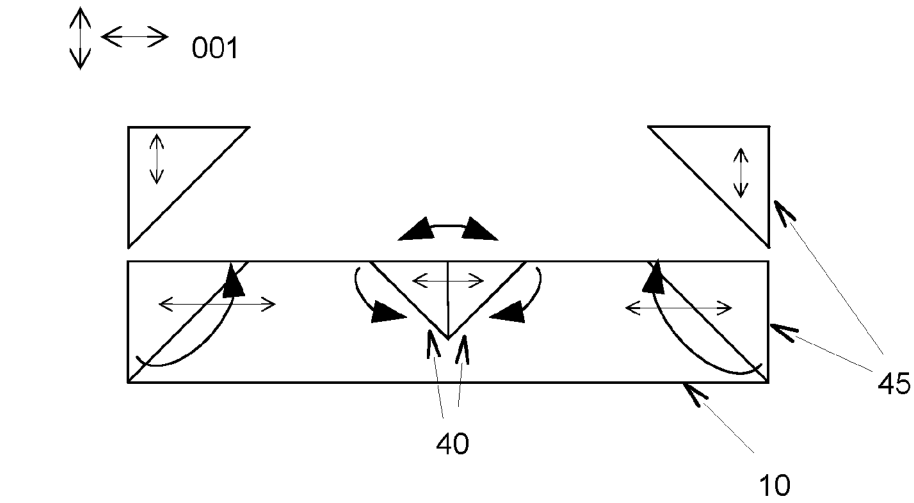
FIG. 7*b* is a schematic illustration of manufacturing logistics of the three-phase reactor core of FIG. 6 according to another embodiment of the present disclosure.

FIG. 7*a* is a schematic illustration of manufacturing logistics of the three-phase reactor core of FIG. 6 according to an embodiment of the present disclosure. The ends of the yokes 10 are cut at a 45° angle to form bevelled ends as for the transformer core described above, and the end elements 45 are then turned 90° and moved e.g. to the other yoke 10 and attached there, in order to change the magnetic orientation 001 at the ends of the yokes 10. Alternatively, in another embodiment as illustrated in FIG. 7*b*, the end elements 45 can instead be attached to the same end of the same yoke as they were cut from, but flipped around so that the opposite surface of the plate is facing the viewer of the figure, with the hypotenuse of the triangle still against the same end of the same yoke as it was cut from. A right-angle triangular cut-out is cut at the centre of the yokes 10, the triangle is cut into half into two building blocks 40 in the same manner as for the transformer core described above, the halves are turned 90°, their places are switched and the halves are put back together again to change the magnetic orientation 001 in a triangular segment at the middle of the yokes 10.

The building elements 40 in the centre of the yokes 10 and the end elements 45 at the ends of the yokes can be cut by laser cutting in an embodiment or by traditional mechanical punching in another embodiment. The building elements 40 in the centre of the yokes 10 can be built together by laser welding in an embodiment, or by other welding technologies in another embodiment, or by gluing or some other attaching means in yet another embodiment, and then used as building blocks which can e.g. be put and forced together with the yoke between yoke clamps with butt joints with small airgaps. Airgaps is an integrated part of a reactor.

Reactor yokes have a tradition to be made of one lamination width to reduce flux density and thereby reduce losses. As mentioned above, the losses are mainly caused by planar cross fluxes. The present embodiments of the reactor core use the anisotropy to better match the three-phase flux coming from the three limbs with segments and the three windings, and allow the flux lines to be guided into the yokes, as similar as possible to a transformer core with L-joints at the outer limbs and T-joints at the centre limbs. FIG. 6 illustrates the new magnetic orientations in the corners and centre joints of a three-phase reactor core according to an embodiment of the present disclosure. The flux and loss situation will thereby be more like a three-phase transformer core in the present embodiments of a three-phase reactor core. Thus, the reactor core according to the present embodiments has lower energy losses than the prior art reactor cores. With the new orientations in the building blocks to match the flux direction, the fluxes will follow the orientation. This will reduce the magnetostriction in those parts as compared to prior art cores with a large magnetostriction. With the present innovation a significant reduction of noise is expected.

Figure 8A:
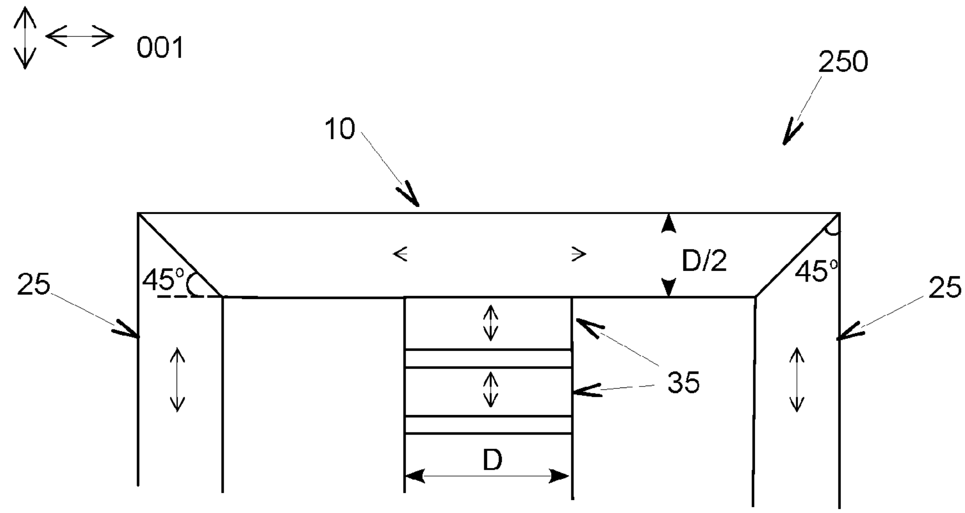
FIG. 8*a* is a schematic illustration of a part of a single-phase reactor core according to prior art.

Single-Phase Reactor Core with Lower Losses, New Design and New Manufacturing Process FIG. 8*a* is a schematic illustration of a part of a single-phase shunt reactor core 250 design according to prior art and shows the T-joint between the centre limb segments 35 of GOES and the top yoke 10 of GOES, and the two top L-joints between the top yoke 10 and the outer limbs 25. The prior art design shown in FIG. 8*a* has two yokes 10 (only the top yoke is shown in the figure) with the same width D/2. The main flux from the centre limb with a width of D has to be guided via the T-joint into the yoke 10 and then divided into two paths flowing towards the L-joints and into the outer limbs 25. This design has the drawback that the main flux has to penetrate into the yoke in the wrong direction, i.e. 90° from the main orientation 001 of the yoke 10. That causes extra losses in the whole shunt reactor and increases also the magnetostriction in a transverse direction which causes increased noise levels.

Figure 8B:
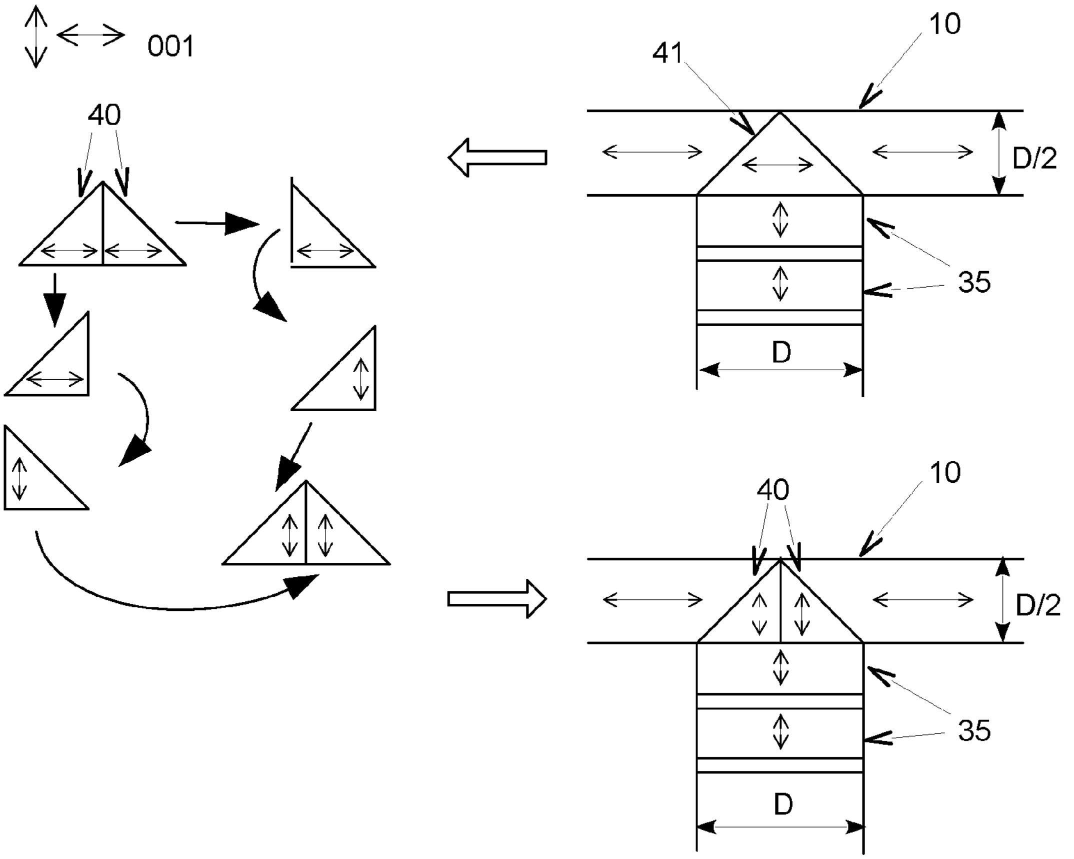
FIG. 8*b* is a schematic illustration of manufacturing logistics of a T-joint in a single-phase reactor core according to an embodiment of the present disclosure.

FIG. 8*b* is a schematic illustration of manufacturing logistics of a new T-joint in a single-phase shunt reactor core according to an embodiment of the present disclosure. As illustrated in the bottom part of FIG. 8*b*, the drawback of the prior art is solved by introducing core building elements 40 with the same orientation as the centre limb segments 35, thereby guiding the main flux from the centre limb into the yoke 10 and out in the two outer loops through the outer limbs 25 with much less reluctance than today's design. Thus, the reactor core according to the present embodiments has lower energy losses and lower sound levels than the prior art reactor cores.

The core building elements 40 are made by cutting a triangular cut-out 41 from the yoke 10 lamination, and with the same methodology as described above it is cut into two halves which are turned 90°, their positions are switched and then they are attached back into the yoke lamination for stacking. As above, the triangle can be cut by laser in an embodiment or mechanically punched in another embodiment, and it can be attached by laser welding in an embodiment, or other types of welding technologies in other embodiments, or by some other attaching means in another embodiment.

Hybrid Transformer Core with New Joint Patterns to Avoid Butt Airgaps for Larger Ratings, New Design and New Manufacturing Process In WO 2014/009054 A1 a three-phase hybrid transformer core is described. The hybrid transformer core comprises a first and a second yoke of amorphous steel and at least two limbs of Grain Oriented Electrical Steel (GOES) steel extending between the yokes. This transformer core has butt joints between the GOES steel in the limbs and the AM steel in the yokes. A drawback with this technology is that the butt joints cause airgaps. Even if the airgaps may be small, i.e. about <1 mm, they cause large magnetizing currents with high current peaks. These current peaks set up similar H-field peaks in the core which cause localized distortion of the flux and thereby local harmonics in the flux increasing the eddy currents and eddy losses in the core. Also, the anomalous losses by harmonics in the domain movements will increase. Another drawback is the local flux saturation at the joint areas in the AM yoke when the flux in the limbs enter into the yokes. Even if the AM yoke has a larger cross-sectional area than the GOES limb, the local flux at the joint areas will be saturated. Both drawbacks will lead to extra core losses and sound level.

Figure 9:
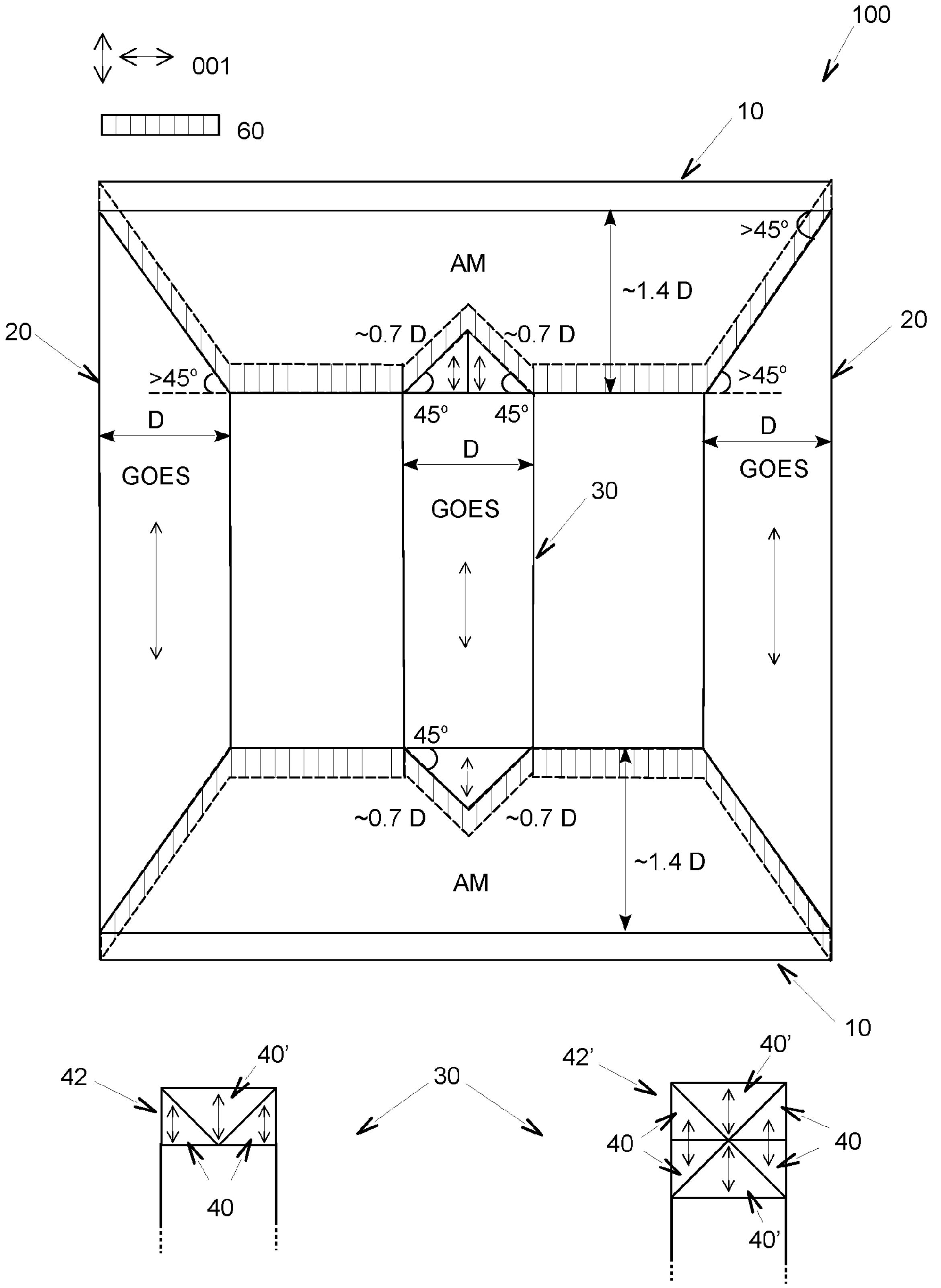
FIG. 9 is a schematic illustration of a three-phase hybrid transformer core according to an embodiment of the present disclosure.

FIG. 9 is a schematic illustration of a new three-phase hybrid transformer core according to an embodiment of the present disclosure, with AM steel in the yokes and GOES in the limbs. AM material saturates at about 1.5T and GOES at about 2T, and therefore, in order to avoid saturation effects in the AM material, the flux density into the AM yokes must be reduced with a factor of >1.3 (or preferably around 1.4-1.5 for some margin) as compared to the flux density in the GOES limbs. This can be accomplished by providing a joint between the GOES part and the AM part which has a length of >1.3 times the width of the GOES part. Thus, in the embodiment illustrated in FIG. 9 the width of the AM yokes is about 1.4 times the width D of the GOES limbs, and the ends of the AM yokes 10 are cut at an angle of >45°, i.e. the bevels formed at the ends have an acute angle which is larger than 45°, or preferably around 55°. The outer limbs 20 are also cut at an angle so that the bevelled ends of the outer limbs 20 fit with the bevelled ends of the yokes 10 to form 90° angles at the corners of the core 100 in FIG. 9.

The centre limb 30 of the embodiment in FIG. 9 is provided with 90° "arrows" at the ends, as described previously in relation to FIG. 1*c* and FIG. 2*a-b*, to fit into triangular cut-outs in the yoke 10. This design also provides a reduction in flux density from the GOES centre limbs 30 into the AM yokes 10 of about a factor of 1.4, since the joints between the centre limbs 30 and the yokes 10 have a length of about 1.4 times the width D of the centre limb due to the geometry (0.7D+0.7D=1.4D). This factor is however not as critical in the centre T-joint as in the L-joints, since the flux from the centre limb is divided into two parts when entering the yoke, as described above.

Furthermore, to avoid the above described drawbacks with butt airgaps causing flux distortion, the new design shown in the embodiment in FIG. 9 has joints with step-lap overlaps. The overlap 60 of the step-lap joints are illustrated with dashed lines in FIG. 9.

The three limbs 20, 30 in the core 100 in FIG. 9 have GOES as material and can be either punched in a traditional steel cutter in an embodiment or cut by an HPL equipment in another embodiment. The yokes 10 are of AM material and should preferably be cut in an HPL equipment. The core can have several layers of steel sheets, which are shifted vertically in relation to each other, so there is an overlap 60 between the different layers. The ends of the AM yokes 10 and the ends of the outer limbs 20 are cut at an angle so that the bevelled ends of the outer limbs 20 fit with the bevelled ends of the yokes 10 to form 90° angles at the corners of the core 100.

In an example embodiment, from a production point of view there can be e.g. 10 GOES sheets of 2.30 mm each glued together, which overlap with 92 AM sheets, also glued together in pieces. This can be optimized in production to match manufacturing costs with extra joint losses. This will later simplify the automatic stacking and top-yoking after winding assembly. The top yoke can for example be assembled together with the whole core, and then be removed in the above pieces before winding assembly.

The centre limb can be cut at 90°, and triangular building blocks can be attached at the ends of the centre limb, for example by HPL welding in an embodiment, or some other type of welding in other embodiments, to form the 90° "arrows" as described above. For example, as shown at the bottom left in FIG. 9, an end cut 42 in the form of a rectangle, or more precisely half a quadrat is cut from a short end of a rectangular GOES limb plate and this half-quadrat is divided into two small isosceles right-angle triangular building elements 40 of equal size and a large isosceles right-angle triangular building elements 40' of twice the size of the small triangular building elements 40. The small triangular building elements 40 are then repositioned and put together into a large triangle such that the short sides of the triangles that have a magnetic orientation parallel to them are facing each other, and attached along their other short sides to one end of the centre limb, and the large triangular building element 40' is attached to the other end of the centre limb with its hypotenuse against the end, to form a 90° "arrow" at each end of the centre limb. In another example, an end cut 42' in the form of a complete quadrat can be cut from a short end of a rectangular GOES limb plate and divided into two large triangular building elements 40' and four small triangular building elements 40, as shown at the bottom right in FIG. 9. This building block then has material enough for two centre limbs. Thus, the centre limb can be manufactured without scrap (the outer limbs are already manufactured without scrap in prior art technology). In these embodiments, the magnetic orientation 001 of the triangular building elements 40, 40' is the same as the magnetic orientation 001 of the centre limb.

The yokes of AM material must get a 45° triangle cut-out 41 in the middle, such that the cut-out 41 from the yoke plate has the same size and shape as the second building elements 40'. This cut-out will be scrap as it cannot be reused again.

The steps for cutting, repositioning and attaching the building blocks of the three-phase hybrid transformer core of FIG. 9 as described above correspond to the step S20 of forming building elements, the step S30 of repositioning the building elements and the step S40 of attaching the building elements according to the method of FIG. 17*a*. Then, in this embodiment the step S50 of building the magnetic further core comprises assembling yoke plates and limb plates with attached building elements with overlap joints between the yoke plates and the limb plates.

Hybrid Reactor Core with Limb Segments/Elements of AM and Yokes with AM or GOES

As mentioned above, single-phase and three-phase reactors have been built the same way during the last 50 years. For all typical units, there are two yokes which connect to one winding for a single-phase reactor or three windings for a three-phase reactor. At larger ratings the windings have several spaced-apart core limb segments inside, the segments dividing the magnetic energy by many airgaps.

As described above, the reactor cores shown in FIGS. 6, 7*a*-7*b* and 8*a*-8*b* reduce the cross and transfer losses in the GOES lamination by guiding the flux into the GOES yokes as similarly as possible to a transformer core with L-joints and T-joints.

Figure 10:
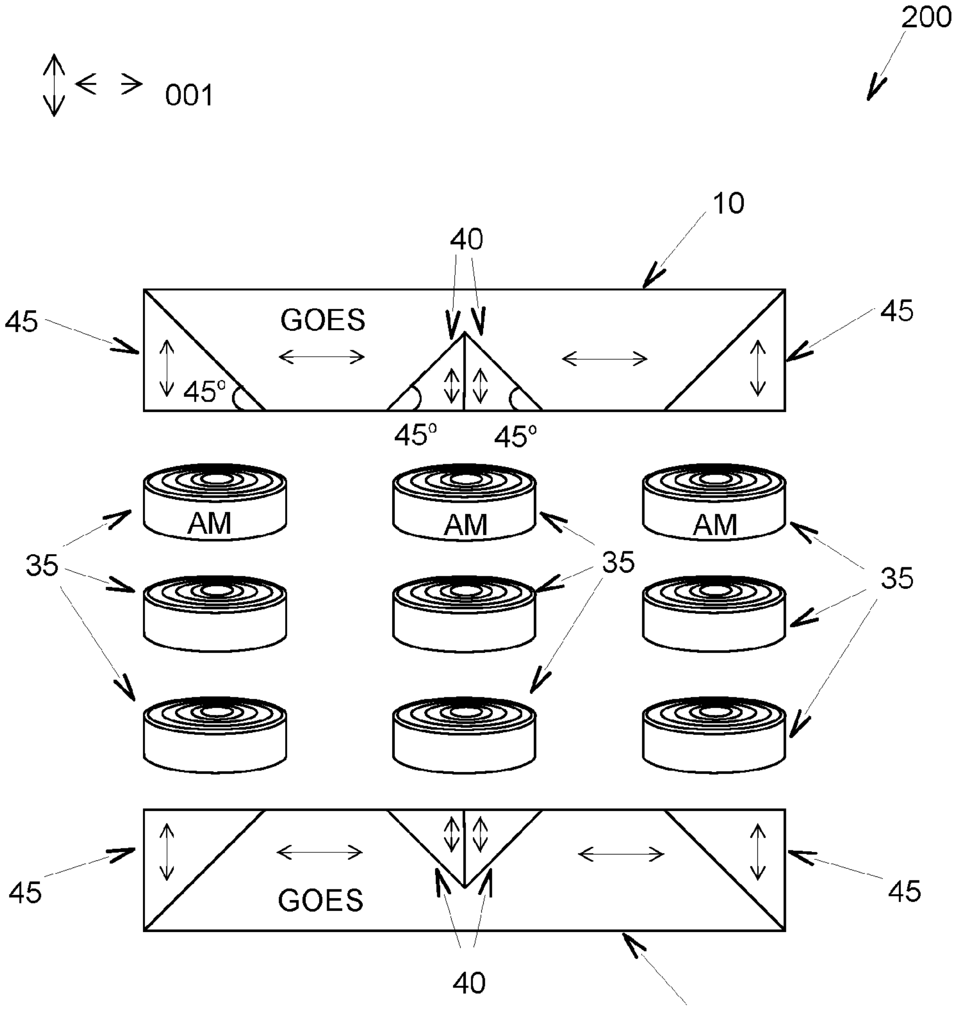
FIG. 10 is a schematic illustration of a three-phase hybrid reactor core according to an embodiment of the present disclosure.
Figure 11:
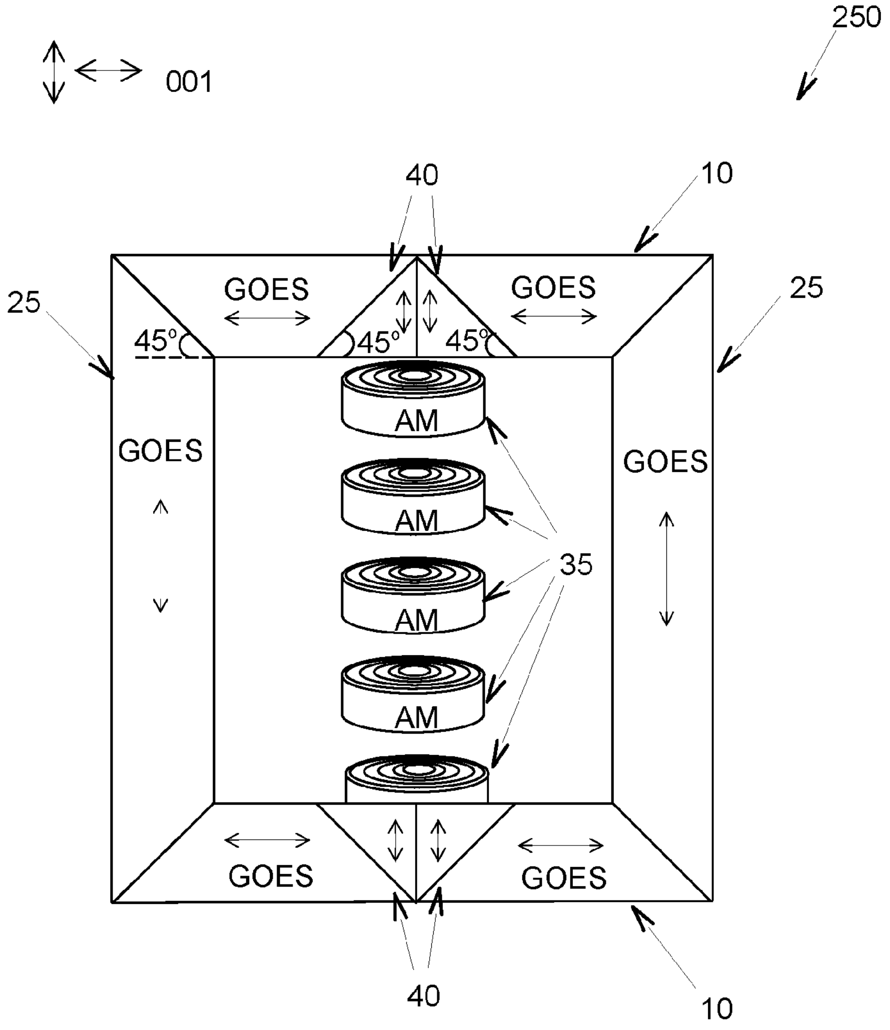
FIG. 11 is a schematic illustration of a single-phase hybrid reactor core according to an embodiment of the present disclosure.

FIG. 10 is a schematic illustration of a three-phase reactor core 200 according to an embodiment of the present disclosure, where the yokes 10 are built from GOES and the limb segments/elements 35 located between the yokes 10 are wound coils built from AM. FIG. 11 is a schematic illustration of a single-phase reactor core 250 according to an embodiment of the present disclosure, where the core limb segments/elements 35 are wound coils built from AM and the yokes 10 and outer limbs 25 are built from GOES. In these embodiments the losses can be reduced even further by using segments of wound coils from AM instead of the core segments of GOES used in the previous embodiments shown in FIGS. 6, 7*a*-7*b* and 8*a*-8*b*. Otherwise, the manufacturing logistics of these cores is the same as for the previous embodiments shown in FIGS. 6, 7*a*-7*b* and 8*a*-8*b*. It is anticipated that the space factor for AM coils are the same as for the GOES pieces/segments. The AM coils containing several turns must be divided such that there are no close turns. All turns must be open and the coils must be provided with turn-to-turn insulation, i.e. all turns must be extra insulated by plastic film/foil. Such insulation film is usually ~5 μm thick. That can be done in the same way that the AM cores are wound today. If this is not done properly there is a risk that the core segment will melt down due to induced currents in the turns.

The loss reduction in the AM segments compared to GOES segments is estimated to be about 300%.

The sound level with less cross fluxes in the yokes and less other vibration patterns should also be reduced as compared to the prior art design.

GOES segments are usually formed in an epoxy process to a hard element in order to stand the compressive pressure. AM segments can be formed in the same manner after it is built as described above, so when the AM coil is delivered from the AM supplier it will be handled the same way as for a GOES segment. It goes into a form with vacuum and epoxy hardening process to be a hard element.

Figure 12:
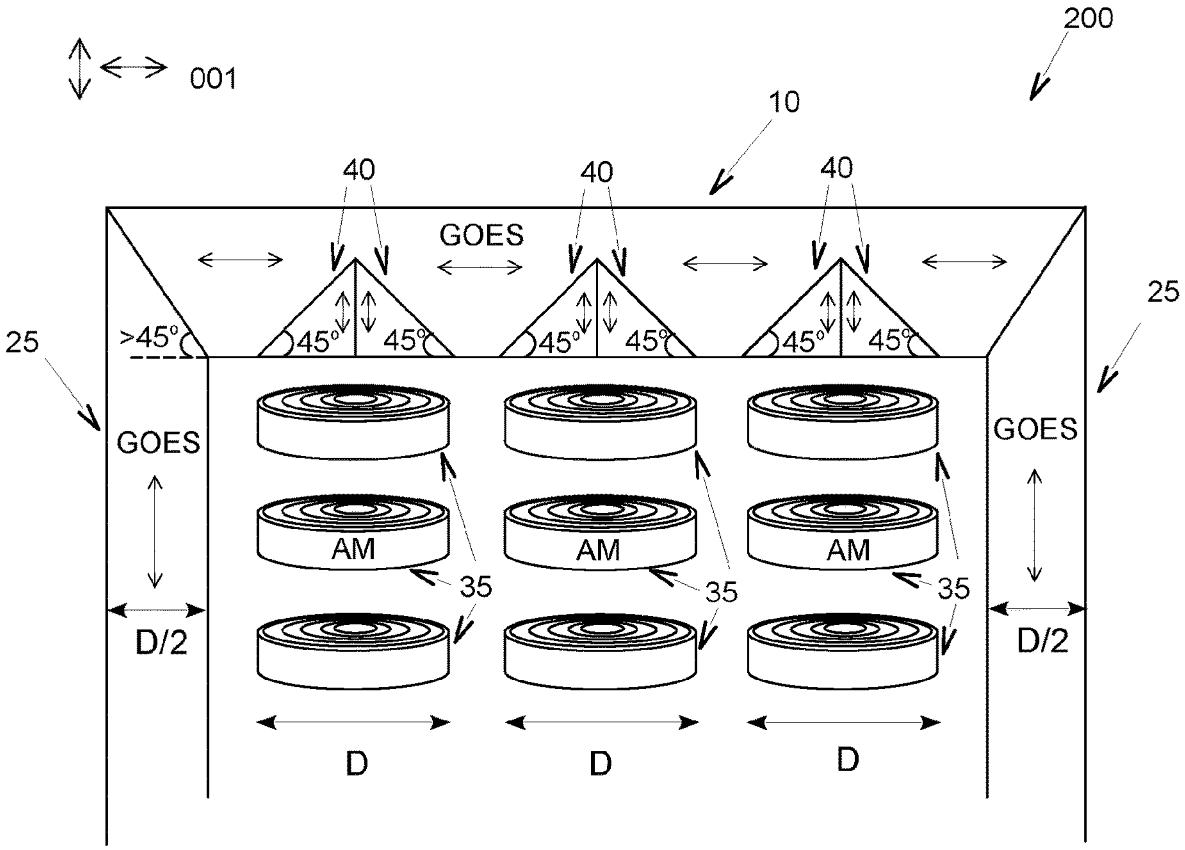
FIG. 12 is a schematic illustration of a three-phase hybrid reactor core with outer limbs according to an embodiment of the present disclosure.

When building large reactor cores, the core may be provided with outer limbs connecting the yokes, for optimization reasons. Due to transportation issues there is a maximum total height for large reactors, and if the reactor is made with outer limbs the height of the yokes can be reduced, the height of the windings can be increased and hence the reactive energy is increased. Accordingly, FIG. 12 is a schematic illustration of a three-phase hybrid reactor core 200 with limb segments/elements 35 of AM, yokes 10 of GOES and outer limbs 25 of GOES (5-limb reactor) according to an embodiment of the present disclosure. The manufacturing logistics of the GOES yokes 10 is the same as for the reactor cores shown in FIGS. 6, 7*a*-7*b*, 8*a*-8*b* and 10-11, with triangular core building elements 40 cut out at a 45° angle. The width of the outer limbs 25 should be half the diameter of the AM coils. If the ends of the yokes 10 is cut at an angle larger than 45° the height of the yokes will be larger than the width of the outer limbs 25.

As mentioned above, the reactor cores of FIGS. 10, 11 and 12 are built with AM in the limb segments and GOES in the yokes, but it is also possible to have other combinations of materials, e.g. GOES in the limb segments, and AM or GOES in the yokes. If the yokes are built with AM material, no cutting of cut-outs or end elements from the yokes are needed.

Hybrid Transformer Core with Limbs of AM and Yokes of GOES

In the hybrid reactor core described above the core segments are manufactured by amorphous core steel. In the following a hybrid transformer core is described where the amorphous material is used in the same manner. GOES material is an anisotropic material with very high magnetic orientation in the rolling direction, which means that the magnetization in the orientation direction takes about 4-5 times less magnetic energy (and losses) than when the material is magnetized in the transverse direction. Therefore, a core segment would never be made in the form of a wound GOES coil since it would then be magnetized at 90° or in a direction transverse to the rolling direction, which would cause large losses. The amorphous material is an isotropic material which consumes the same magnetic energy or losses in all directions. When the amorphous material was invented in the beginning of 1970 it was only used as a substitute for GOES material in wound transformer cores which is the case also today 50 years later. In the hybrid transformer cores described below the limbs are made as amorphous coils which are easily magnetized in a direction transverse to the coil direction since the magnetic energy is the same in all directions. This is a new and important innovation in the transformer industry.

Figure 13:
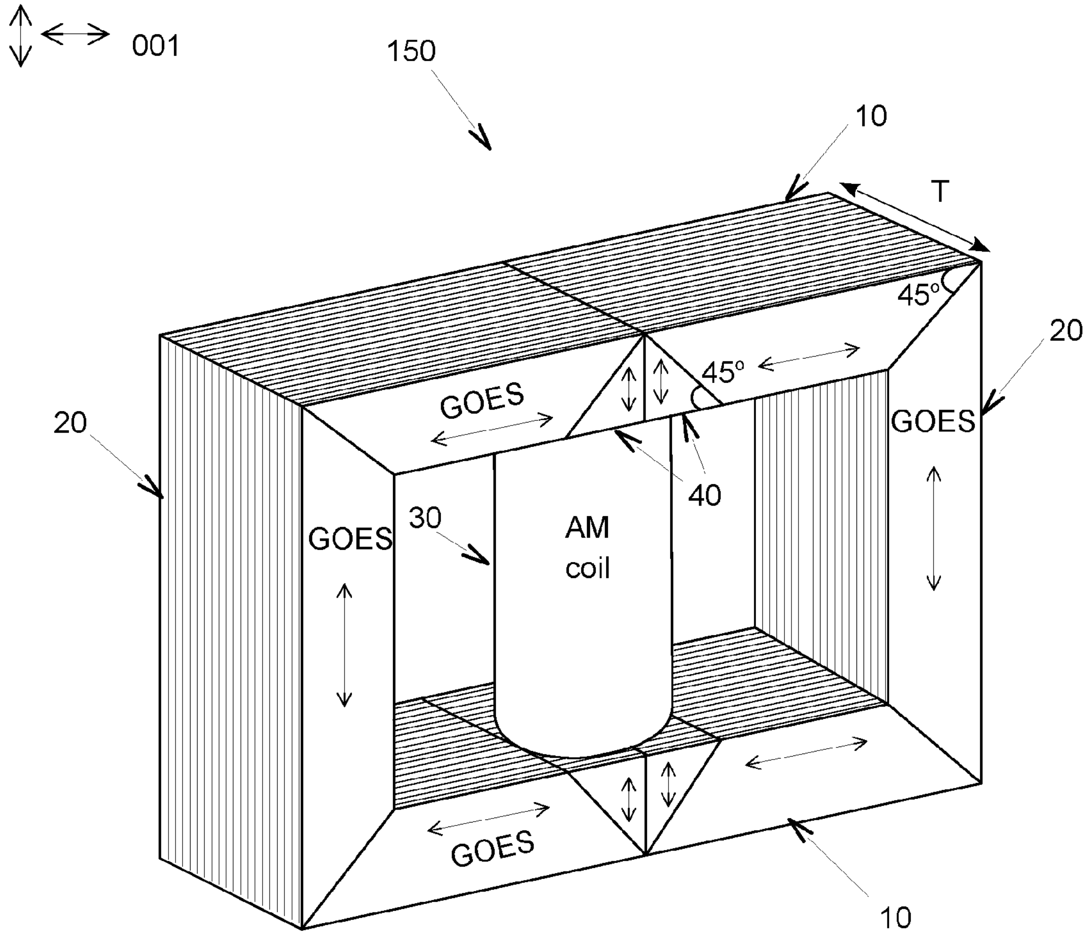
FIG. 13 is a schematic illustration of a single-phase hybrid transformer core according to an embodiment of the present disclosure.
Figure 14:
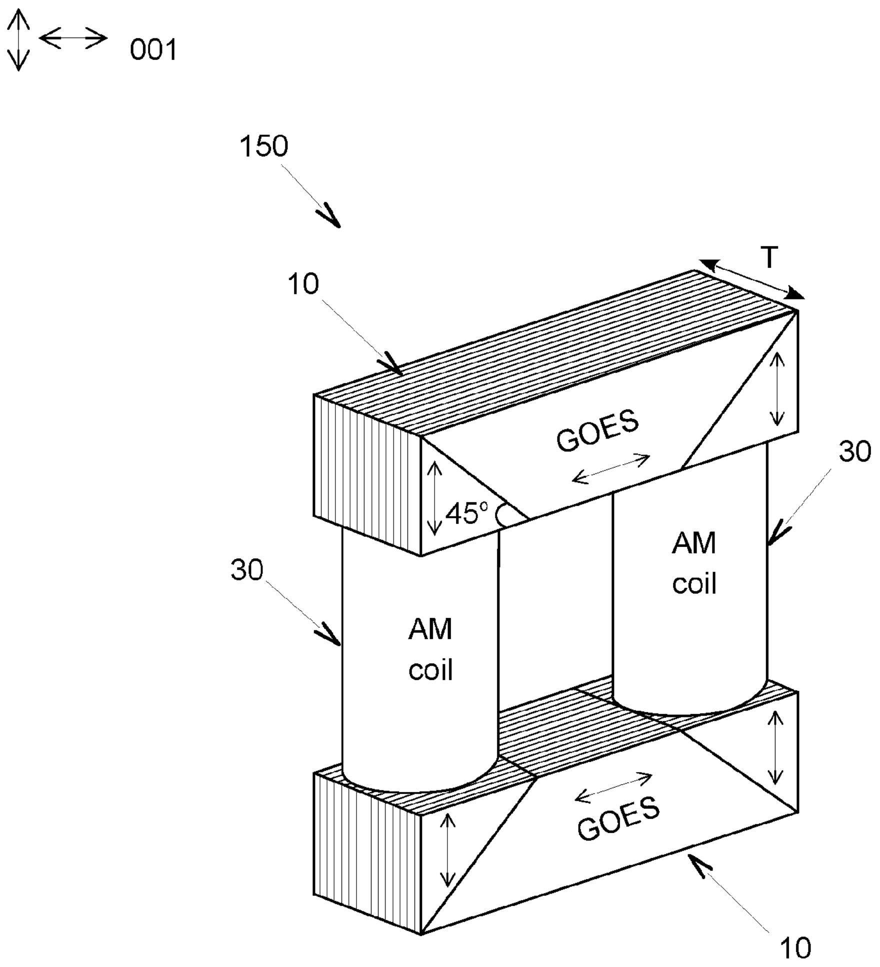
FIG. 14 is a schematic illustration of a single-phase hybrid transformer core according to another embodiment of the present disclosure.

FIGS. 13 and 14 are schematic illustrations of two embodiments of hybrid single-phase transformer cores 150 according to the present disclosure. The cores of FIGS. 13 and 14 are similar to the reactor core of FIG. 11, with yokes 10 built from GOES and AM in the limbs, but with whole limbs 30 of AM coils instead of spaced-apart limb segments of AM. The manufacturing logistics of the GOES yokes in the transformer cores of FIGS. 13 and 14 is the same as for the reactor cores shown in FIGS. 6, 7*a*-7*b*, 8*a*-8*b* and 10-12, with triangular core building elements 40 cut out at a 45° angle. In an embodiment of the transformer cores of FIGS. 13 and 14 the butt joints between the AM limbs and the GOES yokes are provided with insulation. The width T of the GOES yokes in these embodiments should be larger than the diameter of the AM limbs in order to take care of flux leakage from the windings in the AM coil to further minimize losses in the core.

Similarly to the AM limb segments described above, all turns in the AM limb coils must be open and the coils must be provided with turn-to-turn insulation, where the total turns shall be divided into a number of sub-turns, in order to avoid flashover/short circuit between the layers. A mechanically strong but thin AM-coil end insulation to the yoke must be added, and the usual grounding system of all core parts is to be applied. As mentioned previously, sheets of AM steel is limited in width, but to manufacture larger AM limbs several AM sheets can e.g. be placed next to each other with overlap and wound together into a larger interleaved coil. In this way this innovation can already today with the limited AM widths available be used to manufacture larger cores up to nearly about 60 MVA, thus covering half of the yearly global transformer needs.

FIG. 13 illustrates a core with a centre limb 30 of AM and two outer limbs 20 of GOES, similarly to the reactor core of FIG. 11, whereas the core illustrated in FIG. 14 instead has two AM limbs 30. The core with two AM limbs may have some advantages, e.g. since the two limbs can be connected in series to increase the voltage. Also, the yokes of the core with two AM limbs are simpler to manufacture, shorter and therefore more mechanically stable.

Figure 15:
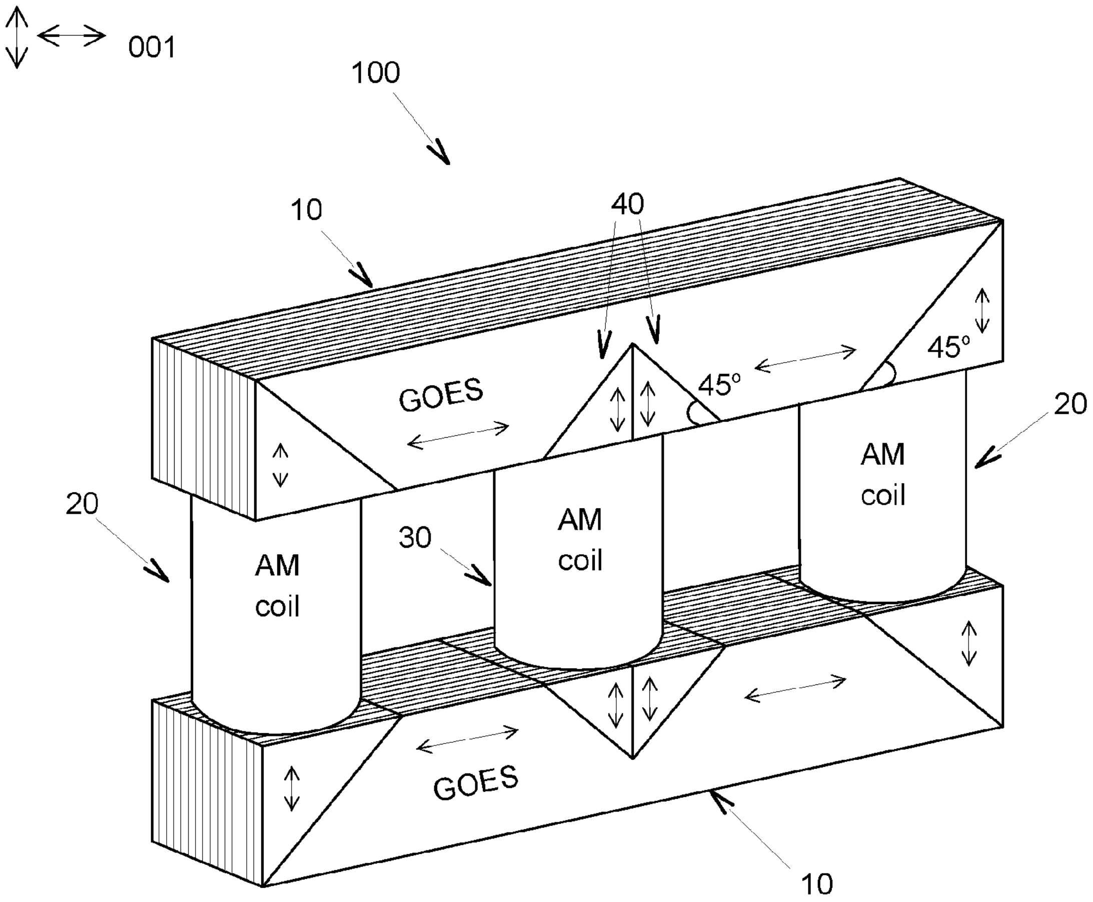
FIG. 15 is a schematic illustration of a three-phase hybrid transformer core according to an embodiment of the present disclosure.

Analogously with the single-phase transformer cores illustrated in FIGS. 13 and 14, FIG. 15 is a schematic illustration of a hybrid three-phase transformer core 100 according to an embodiment of the present disclosure and is similar to the reactor core of FIG. 10, but with whole limbs 20, 30 of AM instead of spaced-apart limb segments.

Stacked Amorphous Metal Distribution Transformer (AMDT) Core with Overlap Joints for Single and Three-Phase Today all AM cores in distribution transformers are made by AM wound cores. Such single phase and three phase transformers are made in different ways with different loops as Evans cores and 5 limb cores and HEXA cores. They all have some major drawbacks:

The real three phase flux has two components, each 60° out of phase so the voltage is set up by a virtual flux which is less in peak value than the values of the two loop components. It means that the real loop flux comes quicker to saturation than the virtual flux.

The loops are made of GOES bands or AM bands and the flux doesn't jump from one turn/band to another without complex reactions. The reluctance paths differ from inner circle to outer circle by almost a factor 1.5-2. This is a huge disadvantage for the flux to be sinusoidal in all local places through the whole volume. This means that all over in the core there are distorted local fluxes with harmonics which give extra losses, so the building factor in those cores are almost 1.5 times higher than in stacked cores.

Also the turn joints with airgaps give peaks in the magnetization currents with peaks in the H-fields which also increases harmonics in flux, and losses.

Wound cores are not energy efficient due to their higher building factor.

A way to avoid these drawbacks is to avoid wound cores and instead use planar stacked one phase or three phase cores. Also for planar stacked GOES cores there are differences in the length of the reluctance paths but the flux can level out a bit in the planar geometry as to reduce the distortion and the magnitude of harmonics in local fluxes. This is more pronounced in AM planar stacked cores which are not built today. There are measurements done showing the difference in building factor for planar cores and wound cores, where wound cores have higher building factors. Wound cores are very simple to make and by the different traditions in the USA and EU since 100 years the single phase transformers started to be used in the single phase Distribution System Operator (DSO) systems in the USA and the countries using the IEEE/ANSI standards. The EU DSO system started almost at the same time but then only with three-phase systems. When the world is now searching for energy efficiency in Distribution System and Transmission System components, innovations for new transformer designs are needed.

Building blocks for a planar stacked AM core can e.g. be cut in an HPL equipment, and a three-phase core can be built up with e.g. 5 rectangular blocks/cuboids with overlap joints and airgaps between the blocks. These rectangular blocks can be made of several layers of thin AM steel of about 10-50 layers. Since AM is isotropic the joints can be done without scrap. It is also possible to set other layers with smaller dimensions to form a possible circular limb.

Figure 16:
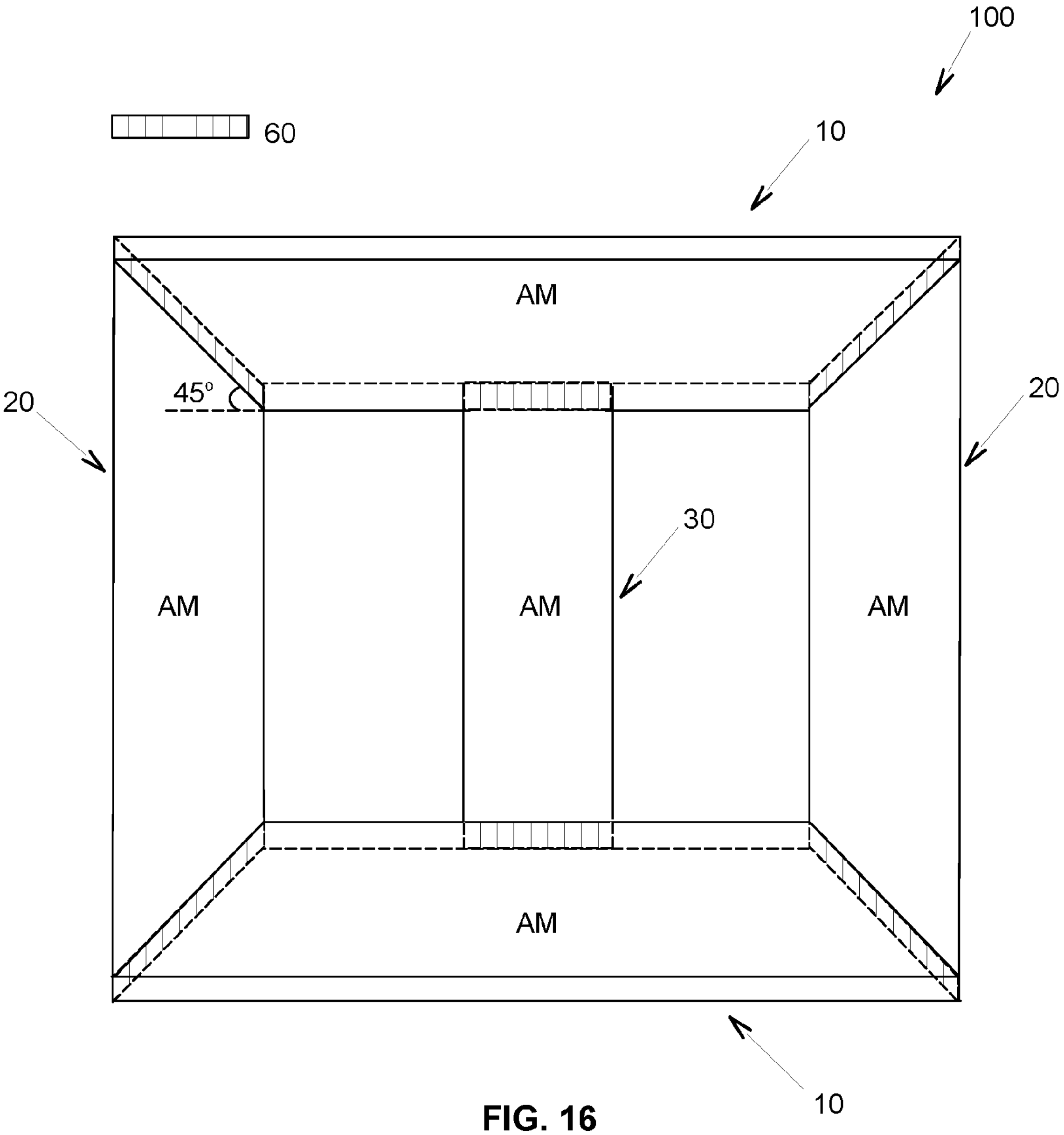
FIG. 16 is a schematic illustration of a stacked Amorphous Metal Distribution Transformer (AMDT) core according to an embodiment of the present disclosure.

A drawback with rectangular blocks is the final core will have many airgaps between the blocks which increases the build-up of magnetic energy. This leads to magnetizing current peaks and H-field peaks inside the core; all causing flux harmonics. This problem can be overcome by building very tight joints with similar overlaps as in a GOES core where the flux jumps from one layer to another layer. FIG. 16 is a schematic illustration of a stacked Amorphous Metal Distribution Transformer (AMDT) core 100 with overlap 60 joints between the yokes 10 and limbs 20, 30 for single and three-phase according to an embodiment of the present disclosure. The core may be built without scrap by cutting the yokes 10 and outer limbs 20 at an angle so that the yokes 10 have bevels at the ends such that a side of the yoke plate facing the other yoke 10 is shorter than the opposite side of the yoke plate, and where the outer limb plates have bevels at the ends fitting with the bevels at the ends of the yoke plates, such that 90° angles are formed at the corners of the magnetic core, where the bevels may have an angle of for example 45° in a particular embodiment as illustrated in FIG. 16, and the centre limb 30 at 90°, e.g. by laser cutting in an embodiment, and attaching them together by e.g. laser welding in an embodiment or other types of welding technologies in other embodiments, or by some other attaching means in another embodiment.

In the design shown in FIG. 16, the reluctance paths in the AM core have the same total permeability in all directions in the plane and in the same time moment. In FIG. 16 the outer limbs are fitted to the yokes by a 45° joint with overlap. But it is also possible to make outer limb joints as in the T-joint with 90° cuts instead of 45° cuts in another embodiment. Other angles of the cut are also possible in other embodiments. The optimal design, e.g. overlap size, and process may be fine-tuned during production start-up. Especially the outer limb joints can only be established after vibration and sound level measurements since the joints decide the oscillation pattern at different vibration harmonics. So, the reluctance is more or less only dependent on the path length, which should give less harmonics in the local fluxes and thereby a smaller building factor. If the GOES specific losses are set to 0.6 W/kg at 1.5 T, 50 Hz, it can be estimated that the core losses for a GOES three-phase transformer core as illustrated e.g. in FIG. 1*b* are 0.6×1.25=0.75 W/kg at 1.5 T and 50 Hz (1.25 is the anticipated building factor). For the stacked AM core with overlap joints as illustrated in FIG. 16 we anticipate that the AM losses at 1.5 T and 50 Hz are 0.22 W/kg with building factor 1.1. We then get the core losses to 1.1×0.22=0.24 W/kg, which is an improvement of 300% by switching from GOES to AM for distribution transformers.

Similarly to the hybrid transformer core illustrated in FIG. 9 the AM sheets can be built by pieces made from 10-50 sheets (=0.25 to 1.25 mm) where the sheets in one embodiment may have a thin glue on the surface to bind them together for simpler handling, or in another embodiment be welded together by e.g. spot welding, or bound together by some other means in other embodiments.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A magnetic core for an electrical power transformer or reactor, the magnetic core comprising:

two parallel and spaced-apart yokes, the yokes comprising rectangular yoke plates made of electrical steel, wherein each yoke plate has a symmetric gap at the middle of a long side of the yoke plate, the symmetric gap facing towards the other yoke, and building elements made of grain oriented electrical steel, positioned in the symmetric gaps in the yoke plates, where the building elements have the same size and shape as the symmetric gap divided into two equal parts and are attached to the yoke plates.

2. The magnetic core according to claim 1, wherein the symmetric gap is formed as an isosceles right-angle triangle with the hypotenuse positioned along the long side of the yoke plate facing the other yoke, and where the building elements are formed as isosceles right-angle triangles, either with the same size as the symmetric gap, or half the size of the symmetric gap.

3. The magnetic core according to claim 1, wherein the symmetric gap is formed as a half-circle with its diameter line positioned along the long side of the yoke plate facing the other yoke, and where the building elements are formed as half-circles with the same size as the symmetric gap, or quarter-circles with half the size of the symmetric gap.

4. The magnetic core according to claim 1, wherein the symmetric gap is formed as an isosceles concave circular triangle with one straight side which is positioned along the long side of the yoke plate facing the other yoke, and where the building elements are formed as isosceles concave circular triangles with the same size as the symmetric gap, or squares with quarter-circles removed, with half the size of the symmetric gap.

5. The magnetic core according to claim 1, wherein the yoke plates and the building elements are made of grain oriented electrical steel, a magnetic orientation of the yoke plates being directed parallel to the long sides of the yoke plates, and wherein the magnetic orientation of the building elements is 90° from the magnetic orientation of the yoke plates.

6. The magnetic core according to claim 1, wherein the magnetic core is for an electrical power reactor and further comprises spaced-apart limb segments located between the yokes, the limb segments being made of wound coils of amorphous electrical steel with turn-to-turn insulation.

7. The magnetic core according to claim 1, wherein the magnetic core is for an electrical power transformer, the magnetic core further comprising at least two limbs extending between the yokes—with 90° angles between the yokes and the limbs, where at least one of the limbs is made of a wound coil of amorphous electrical steel with turn-to-turn insulation.

8. The magnetic core according to claim 1, wherein the magnetic core is for an electrical power transformer, the magnetic core further comprising at least two limbs extending between the yokes with 90° angles between the yokes and the limbs, the limbs comprising rectangular limb plates, where the building elements are attached to the yoke plates or the limb plates.

9. An electrical power reactor comprising the magnetic core according to claim 1.

10. An electrical power transformer comprising the magnetic core according to claim 1.

* * * * *